United States Patent [19]

Masaki et al.

[11] Patent Number: 5,640,389
[45] Date of Patent: Jun. 17, 1997

[54] TRAFFIC SHAPER AND PACKET COMMUNICATION APPARATUS

[75] Inventors: Fumitoshi Masaki; Kiyoshi Shimokoshi, both of Tokyo, Japan

[73] Assignee: Oki Electric Industry Co., Ltd., Tokyo, Japan

[21] Appl. No.: 518,385

[22] Filed: Aug. 15, 1995

[30] Foreign Application Priority Data

Sep. 1, 1994 [JP] Japan .................................. 6-208488

[51] Int. Cl.⁶ .................................................. H04L 12/56
[52] U.S. Cl. ......................................................... 370/418
[58] Field of Search ............................. 395/872, 874, 395/876; 370/60, 60.1, 61, 84, 85.6, 95.1, 99

[56] References Cited

U.S. PATENT DOCUMENTS

| | | | |
|---|---|---|---|
| 5,278,825 | 1/1994 | Wallmeier et al. | 370/84 |
| 5,315,586 | 5/1994 | Charvillat | 370/61 |
| 5,339,332 | 8/1994 | Kammerl | 375/225 |
| 5,400,336 | 3/1995 | Boyer et al. | 370/61 |
| 5,463,620 | 10/1995 | Sriram | 370/84 |
| 5,519,701 | 5/1996 | Colmant et al. | 370/61 |

FOREIGN PATENT DOCUMENTS

| | | |
|---|---|---|
| 0297629A2 | 1/1989 | European Pat. Off. . |
| 0420492A2 | 4/1991 | European Pat. Off. . |
| 0438009A1 | 7/1991 | European Pat. Off. . |
| 4132518A1 | 1/1993 | Germany . |
| 4128411A1 | 4/1993 | Germany . |

OTHER PUBLICATIONS

Sriram, "Methodologies for Bandwidth Allocation, Transmission Scheduling, and Congestion Avoidance in Broadband ATM Networks," IEEE, 0–7803–0608–2/92, 1992, pp. 1545–1551.

Habermann, R., u.a.: Aspekte der ATM–Vermittlung. In: Der Fernmeldeingenieur, 3/'92, 46.Jg., H.3, pp. 1–31; Bild 3,6,8.

IEEE Infocom '94 "Generic Queue Scheduling: Concepts and VLSI" Paul Landsberg and Charles Zukowski, Jun. 12–16, 1994, pp. 11a.4.1 to 11a.4.8.

International Conference on Communications '91 "Design of Leaky Bucket Access Control Schemes in ATM Networks", H. Jonathan Chao, Jun. 23–26, 1991, pp. 6.1.1 to 6.1.8.

*Primary Examiner*—Benedict V. Safourek
*Attorney, Agent, or Firm*—Rabin, Champagne & Lynt

[57] ABSTRACT

A traffic shaper in a packet communication apparatus receives packets and immediately calculates a departure time for each received packet, using designated bandwidth allocation parameters. The packets are stored in a packet memory according to their calculated departure times. When each departure time arrives, the packets that have been stored for that departure time are transferred to an output queue. Packets are output in sequential order from the output queue.

27 Claims, 11 Drawing Sheets

| VPI/VCI | LBc | LR | Ci | Clb | A/B |
|---|---|---|---|---|---|
| 0 | | | | | |
| 1 | | | | | |
| 2 | | | | | |
| ⋮ | ⋮ | ⋮ | ⋮ | ⋮ | ⋮ |
| | | | | | |

104

TRAFFIC SHAPER AND PACKET COMMUNICATION APPARATUS

BACKGROUND OF THE INVENTION

The present invention relates to a traffic shaper that controls bandwidth usage in a packet communication system, and to packet communication apparatus incorporating this traffic shaper, with particular attention to a packet networks employing the asynchronous transfer mode (ATM) protocol.

An ATM network transports information in fixed-length packets referred to as cells. Transport is by time-division multiplexing, with the cell as the basic unit of multiplexing. As shown in FIG. 1, a cell consists of a header 2 and payload field 4. The transport of each cell is controlled by its header 2, which indicates the type of cell and where the cell is to be routed. The payload field 4 contains the payload information of the cell.

The multiplexing is asynchronous in that there are no fixed time-slot assignments on the network communication lines. Any cell can be placed in any available time slot. If necessary, idle (empty) cells are transmitted to fill unused time slots, so that each communication line carries a steady cellstream. Idle cells are identified as such in their headers. The headers of non-idle cells contain routing information consisting of a virtual path identifier (VPI) and virtual channel identifier (VCI), or a line identifier (Nc).

The cellstream on each communication line in a network may include various types of cell traffic, having different data rates, some of which may fluctuate. Traffic is controlled according to contracts that are negotiated when connections are set up. These traffic contracts allocate network bandwidth by specifying rates at which cells can be sent, and may specify other information such as priority. Each node in the network must shape its outgoing cell traffic so as to stay within these bandwidth allocations. The part of the node apparatus that performs this function is referred to as the traffic shaper. The purpose of traffic shaping is to prevent degradation of communication quality due to congestion at receiving nodes.

Two other functions of an ATM network node, performed in particular at nodes where cell traffic exits the network, are to distribute the cellstream multiplexed onto a network communication line to several outgoing lines, and to convert the cells distributed to each of these lines to the format required for transmission on that line. This last function is referred to as framing. The part of the communication apparatus that performs the distribution and framing functions at a network node is referred to as the line distributor.

FIG. 2 illustrates the traffic shaper and line distributor roles in an ATM communication network 25, when data are sent from a transmitting terminal 30 to a receiving terminal 31. The network 25 includes a first ATM communication apparatus 32 (such as an ATM switch) to which the transmitting terminal 30 is connected, a second ATM communication apparatus 33 (such as another ATM switch) to which the receiving terminal 31 is connected, and a third ATM communication apparatus 34 (such as another ATM switch, or a cross-connect apparatus) coupled between the first and second apparatuses 32 and 33. The first and second apparatuses 32 and 33 are also connected to other terminals 35 and 36. Traffic shapers (S) in the three apparatuses 32, 33, and 34 control the rate and timing at which cells originating at the transmitting terminal 30 can depart from these apparatuses 32, 33, and 34. The line distributor (D) in the second apparatus 33 distributes and frames the outgoing cells.

A virtual connection exists between the transmitting terminal 30 and the receiving terminal 31 in FIG. 2, in that a specific virtual path and channel are assigned to this connection at each ATM communication apparatus 32, 33, and 34. Multiplexing enables each apparatus to serve a large number of connections simultaneously.

FIG. 3 is a block diagram of a conventional traffic shaper 400, comprising a cell screening unit 401, a header extraction unit 402, a write controller 403, a scheduling table 404, a read controller 405, and a cell buffer bank 410. The cell buffer bank 410 has a plurality of cell buffers 411, 412 ... 41n, each of which operates as a first-in-first-out (FIFO) buffer. A different buffer is used for each connection. These components are linked by signal lines 450 ... , 47n as indicated in the drawing.

Input cells 490 arriving on signal line 450 are sent to the cell screening unit 401, which decides from the header of each cell whether the cell is idle or not. Non-idle cells are passed to the header extraction unit 402 on signal line 451. The header extraction unit 402 extracts the cell header, reads the virtual path and channel identifiers (VPI/VCI), and passes these identifiers to the write controller 403 on signal line 452. From the VPI/VCI information, the write controller 403 identifies the connection to which the cell belongs, selects the FIFO cell buffer assigned to that connection, and sends a write command over the corresponding one of the signal lines 461 ... , 46n, causing the cell to be stored in the corresponding FIFO cell buffer.

The scheduling table 404 contains information specifying the rate at which cells are to be read from each of the FIFO cell buffers 411 ... , 41n. The rate is chosen so as to satisfy the conditions of the traffic contract for the corresponding connection, and corresponds to the bandwidth allocated to that connection. The read controller 405 schedules cell output according to this information, which it receives via signal line 453, and sends read commands to the FIFO cell buffers 411 ... , 41n via signal lines 471 ... , 47n at the appropriate rates, selecting one cell buffer at a time. The selected buffer places an output cell 491 on signal line 454. If the selected buffer is empty, an idle cell is output.

The bit length of the virtual path and channel identifiers (twenty-four or twenty-eight bits) enables millions of different connections to coexist at one node. When the number of connections becomes this large, however, the method of traffic shaping employed in this conventional traffic, shaper 400 encounters certain problems.

One problem is that a very large amount of buffer memory is required to provide a separate cell buffer for each connection. In practice, the number of connections supported by a traffic shaper of this type tends to be much less than the theoretical maximum.

This problem can be attacked by allowing different connections to share a single buffer, but this solution is not entirely satisfactory, because it fails to provide for traffic management of individual connections. A shared buffer can also be swamped by simultaneous bursts of activity on several connections. If the buffer is made large enough to prevent this, then buffer memory will be wasted because much of the buffer space will usually be unused.

Another problem with the conventional traffic shaper 400 is that it tends to waste network bandwidth resources by transmitting unnecessary idle cells. This occurs whenever the buffer scheduled for cell read-out is empty, forcing output of an idle cell, even though there are cells waiting for output in other buffers. This problem becomes increasingly serious as the number of connections increases, because the buffers that actually have cells to be output will be scheduled for output a decreasing proportion of the time.

Regardless of the number of connections, the problem of waste of bandwidth resources is aggravated when certain connections are given higher priority than others to ensure that their cells are output with minimum delay. To allow for irregularities in cell arrival times, these connections must be given extra bandwidth by scheduling their buffers for output at a higher rate than the actual rate specified in the traffic contract. This ensures, however, that the buffers will often be empty when read, forcing output of idle cells. Assigning extra bandwidth to high-priority connections also reduces the number of connections that can be handled, forcing a curtailment of the amount of service that can be provided.

Still another problem of the conventional traffic shaper 400 is that it produces uneven cell delays, because the order of output of the cells is determined by the order in which the buffers are scheduled, and not by the order in which the cells arrive. Other conditions being equal, a cell that happens to arrive Just after the scheduled time for output from its buffer will have a longer wait than a cell that happens to arrive just before the scheduled output time.

A further problem concerns the line distributors at network edge nodes. The cellstream received from the traffic shaper at one of these nodes is not tailored to the needs of the line distributor, so to distribute and frame the cellstream, the line distributor requires a large buffer in which it can temporarily store cells. It is inefficient to have large buffers in both the traffic shaper and line distributor; it would obviously be desirable to reduce the total buffer requirement.

These problems have been described in relation to an ATM network, but similar traffic-shaping problems occur in other packet communication systems: too much memory space is required for packet buffering; it is difficult to handle a very large number of connections simultaneously; and regardless of the number of connections, network bandwidth resources are not used efficiently.

SUMMARY OF THE INVENTION

It is accordingly an object of the present invention to reduce the amount of memory required for traffic shaping in a packet network.

Another object of the invention is to enable a network node to handle a large number of connections simultaneously.

Another object of the invention is to use memory efficiently in the traffic shaper.

Another object of the invention is to use network bandwidth resources efficiently, by avoiding the unnecessary transmission of idle cells.

Another object of the invention is to grant delay priority without wasting bandwidth resources.

Another object of the invention is to reduce the amount of buffer memory and other hardware required for line distribution.

The invented traffic shaper receives packets and immediately calculates a departure time for each received packet, using designated bandwidth allocation parameters. The packets are then stored in a packet memory according to their calculated departure times. When each departure time arrives, the packets that have been stored for that departure time are transferred to an output queue. Packets are output in sequential order from the output queue.

The invented packet communication apparatus sends and receives packets at a node in a packet communication network, using the invented traffic shaper to control packet output from the node.

DETAILED DESCRIPTION OF THE INVENTION

Embodiments of the invention will be described with reference to the attached illustrative drawings. The first two embodiments will employ a cell memory organized into elements chained by pointers, so before the embodiments themselves are described, it will be useful to describe the concepts of element, pointer, and chaining.

Element and Pointer Concepts

Figure 4:
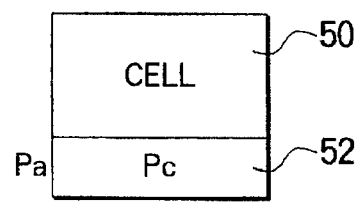
FIG. 4 illustrates the structure of an element.

Referring to FIG. 4, an element, as the term is used herein, is a unit of information stored in a memory area identified by an address Pa. The element consists of a cell information field (CELL) 50 and a chain pointer field (Pc) 52. The cell information field 50 has the capacity to hold all the information in one cell, including both header and payload information. The chain pointer field 52 normally holds the address of another element to which this element is chained.

Figure 5:
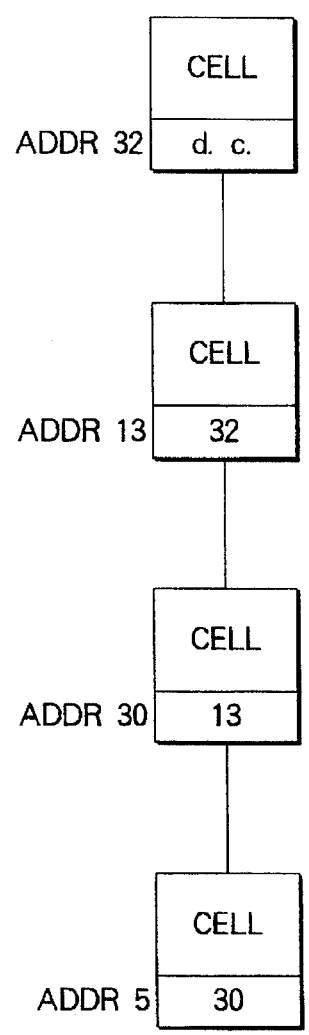
FIG. 5 illustrates the structure of a chain.

A chain of elements is formed by storing pointers from one element to the next in the chain pointer fields of the elements. FIG. 5, for example, shows a chain consisting of four elements with addresses 5, 30, 13, and 32. The chain pointer field of each element in the chain contains the address of the next element in the chain. For example, the chain pointer field of the first element (at address 5) contains the address (30) of the second element. The chain pointer field of the last element (at address 32) contains meaningless information indicated by the letters d. c. (standing for don't care).

One way to identify this chain is to write the addresses of all its elements in order (5, 30, 13, 32). A simpler way is to specify only the addresses of the first and last elements (5, 32). These two addresses are referred to as the first-element pointer and the last-element pointer of the chain. The rest of the chain is defined by the pointers in the chain pointer fields of the elements themselves. This simpler method of identifying chains will be used in the embodiments below.

The addresses in the chain pointer fields of the chains in these embodiments will point forward, from the first element toward the last, as in FIG. 5. The invention ran also be practiced, however, with backward chain pointers that point from the last element toward the first.

A degenerate chain can consist of just one element, in which case the first-element and last-element pointers are the same. Single-element chains can be identified by comparing the first-element and last-element pointers.

Figure 6:
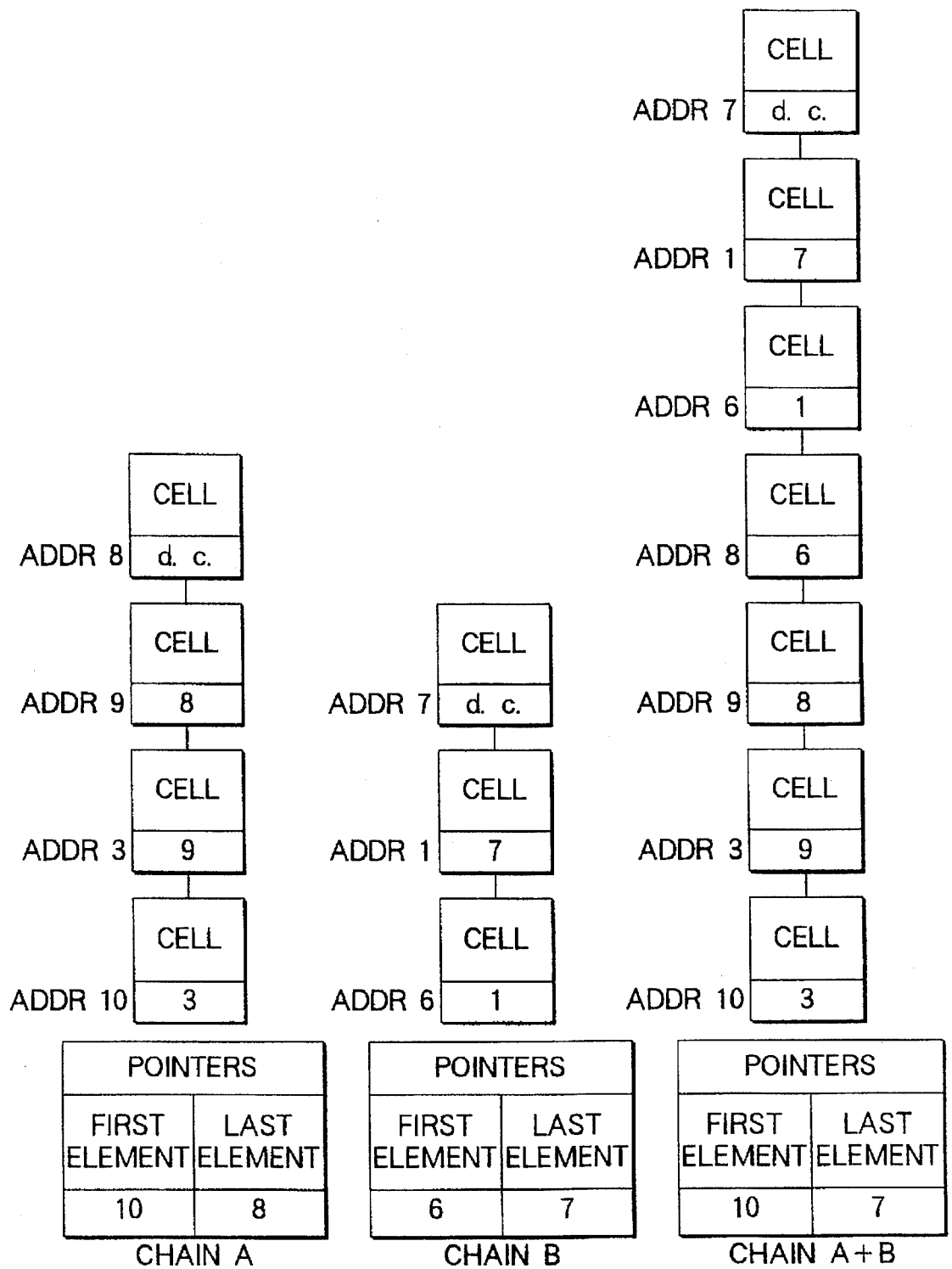
FIG. 6 illustrates the concatenation of chains.

Two chains can be concatenated to form a new chain by manipulating their pointers, without moving any elements to new addresses. The procedure can best be explained through an example. In FIG. 6, chain A (10, 3, 9, 8) and chain B (6, 1, 7) are concatenated to form a new chain A+B by the following three steps:

Step one: The value of the first-element pointer (6) of chain B is copied into the chain pointer field of the last element of chain A.

Step two: The first-element pointer (10) of chain A is made the first-element pointer of chain A+B.

Step three: The last-element pointer (7) of chain B is made the last-element pointer of chain A+B.

Similar steps can be used to extend a chain by concatenating another chain or element to it at one end, as will be done in the embodiments.

First Embodiment

A first novel traffic shaper will now be described with reference to the drawings. This traffic shaper is intended primarily for shaping traffic from one node to another node in a communication network, although it can also be used to shape traffic from a node to a plurality of receiving terminals if a separate line distributor is provided.

It will be assumed that the packets processed by the traffic shaper are ATM cells, and that cell traffic is managed in terms of connections, each specified by a virtual path identifier and a virtual channel identifier. The combination (VPI/VCI) of these identifiers will be referred to as the address of the connection.

Figure 7:
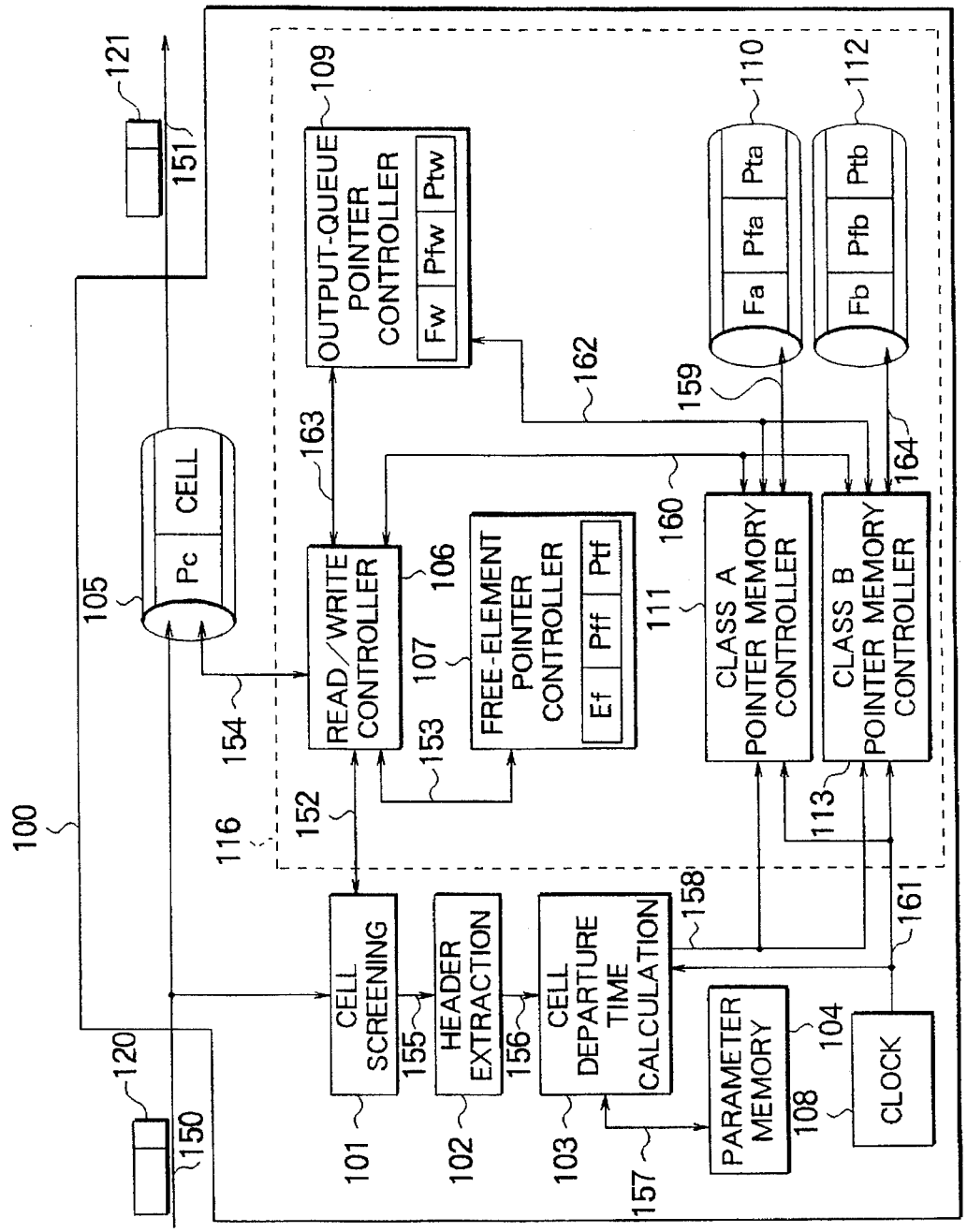
FIG. 7 is a block diagram of a first novel traffic shaper.

FIG. 7 illustrates the structure of this first novel traffic shaper 100, which comprises a cell screening unit 101, a header extraction unit 102, a departure time calculation unit 103, a traffic parameter memory 104, an element memory 105, a read/write controller 106, a free-element pointer controller 107, an internal clock unit 108, an output-queue pointer controller 109, a class A pointer memory 110, a class A pointer memory controller 111, a class B pointer memory 112, and a class B pointer memory controller 113, interconnected by signal lines 150 . . . , 164. The term "signal line" should be understood as referring, not necessarily to a single electrical interconnecting line, but to an internal data path with a certain bit width. The read/write controller 106, free-element pointer controller 107, output-queue pointer controller 109, class A pointer memory 110, class A pointer memory controller 111, class B pointer memory 112, and class B pointer memory controller 113 constitute an element memory control unit 116.

The cell screening unit 101 checks the header of an input cell 120 and informs the header extraction unit 102 and read/write controller 106 whether the cell is idle or not.

If the input cell 120 is not idle, the header extraction unit 102 extracts the header of the cell, reads the virtual path and channel identifiers (VPI/VCI) from the header, and sends the VPI/VCI address to the departure time calculation unit 103.

The departure time calculation unit 103 uses this address, together with parameters stored in the traffic parameter memory 104 and the present time output by the internal clock unit 108, to calculate a departure time for this cell 120. Details will be described later.

The traffic parameter memory 104 stores bandwidth allocation and delay priority parameters for each connection; that is, for each VPI/VCI address. The departure time calculation unit 103 uses the bandwidth allocation parameters.

Figure 8:
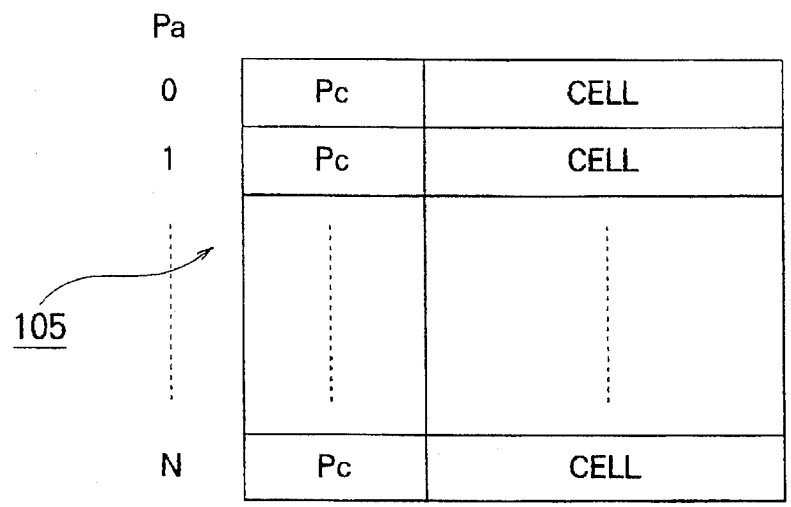
FIG. 8 illustrates the physical structure of the element memory in FIG. 7.

The element memory 105 consists of elements in which the input cells are stored. As shown in FIG. 8, the element memory 105 is physically organized into element areas, each having one chain pointer field (Pc) and its paired cell information field. Each element area is identified by a separate address (Pa). Each element can become a free element, an assigned element, or an output-queued element; these element types will be described later. The address of an element does not determine the element type.

Figure 9:
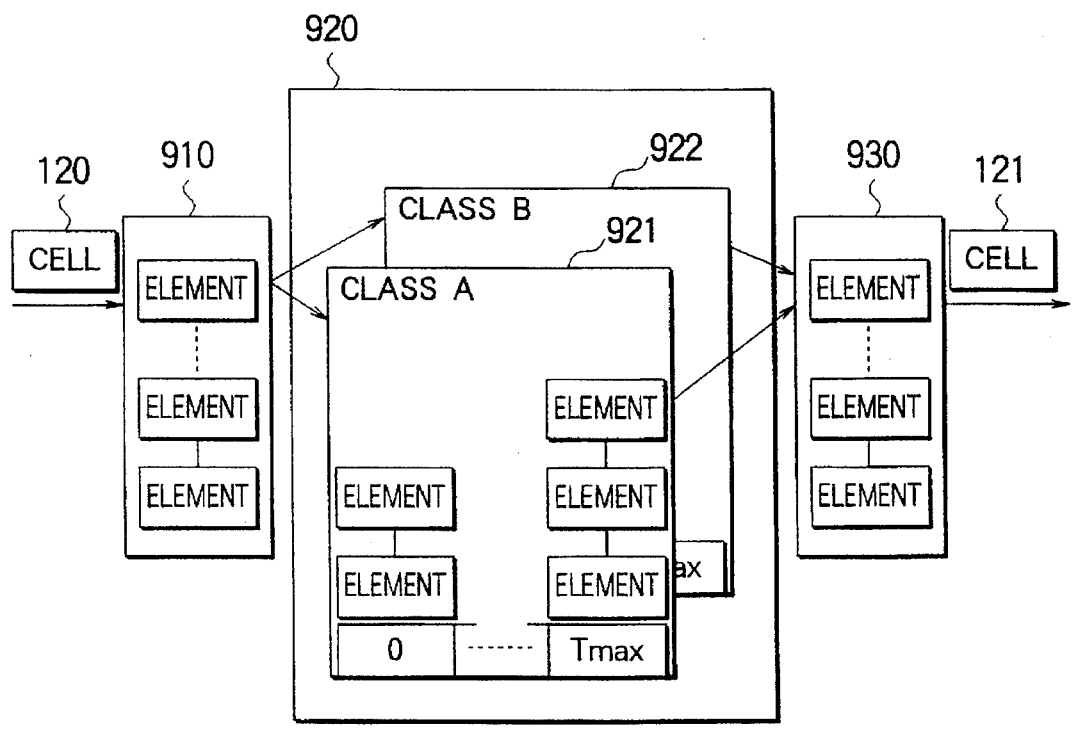
FIG. 9 illustrates the logical structure of the element memory in FIG. 7.

FIG. 9 shows the logical organization of the element memory 105. The element memory 105 is logically divided into a free-element pool 910, an assigned-element pool 920, and a output-element pool 930. Each element belongs to a chain in one of these pools. The assigned-element pool 920 is further divided into two sub-pools or planes 921 and 922, which have different delay priorities. In this embodiment there are two delay priority classes, A and B. Plane 921 is for class A, and plane 922 for class B. Class A has higher priority than class B.

All elements in the free-element pool 910 are linked in a single chain. A free element is an element that does not have valid cell information stored in its cell information field. From FIG. 4 and FIG. 8 it can be seen that an element does not contain any intrinsic indication as to whether it is free or not. This depends solely on whether or not the element belongs to the free-element chain in the free-element pool 910. The free-element pool 910 is managed by the free-element pointer controller 107, as described later.

Similarly, all elements in the output-element pool 930 are linked in a single chain, referred to as the output queue. The elements in this queue (referred to as output-queued elements) have valid cell information stored in their cell information fields, and are awaiting their turn for output of the cell information. Like free elements, output-queued elements are identified solely by their presence in the output queue, and not by any internal indication. The output-element pool 930 is managed by the output-queue pointer controller 109, as described later.

The assigned-element pool 920 stores elements, referred to as assigned elements, that have valid cell information in their cell information fields, and are awaiting transfer to the output-element pool 930. As shown in FIG. 9, in each plane 921 and 922, a separate chain of assigned elements is maintained for each departure time. These chains are managed by the class A and class B pointer memory controllers 111 and 113, using information stored in the class A and B pointer memories 110 and 112. Like free elements and output-queued elements, assigned elements are identified solely by their presence in the assigned-element pool 920, and not by any indication in the element itself.

The read/write controller 106 controls the reading and writing of information in the element memory 105.

The free-element pointer controller 107 has an internal pointer memory in which it maintains a first-element pointer Pff indicating the first element in the free-element chain (in the free-element pool 910), a last-element pointer Ptf indicating the last element in the free-element chain, and a free-element flag Ff indicating whether or not any free elements exist. The free-element flag Ff takes, for example, the value "zero" to indicate that there are no free elements, and the value "one" to indicate that at least one free element exists. This Information is used mainly in relation to the storing of input cells 120 in the element memory 105.

The internal clock unit 108 is a counter that generates a current time value, which it supplies to the departure time calculation unit 103, the class A pointer memory controller 111, and the class B pointer memory controller 113. The minimum time value is zero. The maximum time value will be denoted Tmax. The time value cycles repeatedly from zero to Tmax. Cell output operations are synchronized with this time value, and are carried out whenever the time value changes.

The output-queue pointer controller 109 has an internal pointer memory in which it maintains a first-element pointer Pfw indicating the first element in the output queue (in the output-element pool 930), a last-element pointer Ptw indicating the last element in the output queue, and an output-queue flag Fw indicating whether or not any output-queued elements exist. The output-queue flag Ff takes, for example, the value "zero" to indicate that there are no output-queued elements, and the value "one" to indicate that at least one output-queued element exists. This information is used mainly in relation to the output of cells from the element memory 105.

For each assigned-element chain in priority class A (i.e. for each element chain in plane 921 in the assigned-element pool 920), the class A pointer memory 110 stores a pointer Pfa to the first element in the chain, a pointer Pta to the last element in the chain, and a flag Fa indicating whether these pointers Pfa and Pta are valid or not. The class A pointer memory 110 is accessed by specifying addresses corresponding to departure times. The information in the class A pointer memory 110 is used in operations on the assigned-element and output-element pools 920 and 930, as described later.

The class A pointer memory controller 111 controls the reading and writing of the pointers Pfa and Pta and flags Fa in the class A pointer memory 110.

Similarly, for each assigned-element chain in priority class B (for each element chain in plane 922), the class B pointer memory 112 stores a pointer Pfb to the first element in the chain, a pointer Ptb to the last element in the chain, and a flag Fb indicating whether these pointers Pfb and Ptb are valid or not. The class B pointer memory 112 is also accessed by specifying addresses corresponding to departure times. The information in the class B pointer memory 112 is used in operations on the assigned-element and output-element pools 920 and 930, as described later.

The class B pointer memory controller 113 controls the reading and writing of the pointers Pfb and Ptb and flags Fb in class B pointer memory 112.

Next, the operations performed by the traffic shaper 100 will be described. These operations comprise cell input operations and cell output operations, which are performed concurrently. Cell input operations will be described first.

Referring again to FIG. 7, an input cell 120 is received on signal line 150 and passed first to the cell screening unit 101. The cell screening unit 101 immediately issues a write request to the read/write controller 106 via signal line 152.

Upon receiving this write request, the read/write controller 106 first checks the free-element flag Ff maintained by the free-element pointer controller 107, via signal line 153. If the free-element flag Ff indicates that there are no free elements (Ff=0), the read/write controller 106 notifies the cell screening unit 101 via signal line 153, and further processing of this input cell 120 is abandoned. That is, the traffic shaper 100 drops this input cell 120 and waits for the next input cell. If the element memory 105 has an appropriate size, input cells 120 will almost never be dropped in this way.

If the free-element flag Ff indicates that there is a free element (Ff=1), the read/write controller 106 reads the value of the first-element pointer Pff maintained by the free-element pointer controller 107 via signal line 153, and sends this value together with a write command via signal line 154 to the element memory 105, causing the input cell 120 to be stored in the cell information field of the element at the address indicated by pointer Pff.

Upon issuing the write request to the read/write controller 106, the cell screening unit 101 proceeds to determine whether the input cell 120 is idle or not. If the input cell 120 is idle, the cell screening unit 101 takes no further action. If the input cell 120 is not idle, the cell screening unit 101 passes the input cell 120 to the header extraction unit 102 via signal line 155, and sends the read/write controller 106 a free-element-pointer update request via signal line 152.

Depending on the timing of the above operations, when the free-element flag is zero, (Ff=0), the read/write controller 106 may receive a free-element-pointer update request before it has had time to notify the cell screening unit 101 that there are no free elements. In this case the read/write controller 106 ignores the free-element-pointer update request, and when the cell screening unit 101 is notified that there are no free elements, it commands the header extraction unit 108 to ignore the input element 120.

If the free-element flag Ff indicates that a free element is present (Ff=1), the read/write controller 106 processes the pointer update request as follows.

First, the read/write controller 106 checks the first-element and last-element pointers Pff and Ptf maintained by the free-element pointer controller 107, via signal line 153. If these two pointers match (Pff=Ptf), the read/write controller 106 instructs the free-element pointer controller 107, via signal line 153, to clear the free-element flag Ff to zero, to indicate that there are no longer any free elements. The reason for doing this is that Pff=Ptf implies that there was only one free element, in which the input cell 120 is now being (or has already been) stored, leaving no free elements available. If Pff and Ptf do not match, the free-element flag Ff is left set to one.

Next, the read/write controller 106 reads the chain pointer field Pc of the first element in the free-element chain (the element currently indicated by PFF, in which the input cell 120 is stored), via signal line 154. The read/write controller 106 passes the contents of this field Pc to the free-element pointer controller 107 via signal line 153. The free-element pointer controller 107 updates the first-element pointer Pff so that it indicates the received Pc value. (This update can be omitted if the free-element flag Ff has been cleared to zero.) The read/write controller 106 retains the old Pff value for later use.

As a result of the operations above, when a cell is input, if a free element is available, the cell is stored in the cell information field of that element. If the cell is not idle, the first-element pointer Pff of the free-element chain is updated and the cell is passed to the header extraction unit 102.

If the cell is idle, although the cell may be stored in a free element in the element memory 105, the free-element pointer Pff and flag Ff are not updated, so the element in which the idle cell is stored remains free. The idle cell data stored in the cell information field of this element are invalid, and will be overwritten when the next cell is input.

If the cell is not idle, the header extraction unit 102 extracts the virtual path and channel identifiers (VPI/VCI) from the cell header, passes them to the departure time calculation unit 103 via signal line 156, and requests the departure time calculation unit 103 to calculate a cell departure time Td. The departure time calculation unit 103 calculates Td according to information in the traffic parameter memory 104, which is read via signal line 157.

The cell departure time Td can be calculated by any suitable method satisfying the bandwidth conditions stipulated for the particular VPI/VCI. One possible method employs a so-called leaky-bucket model, which will be described next as an example.

Figures 10, 11:
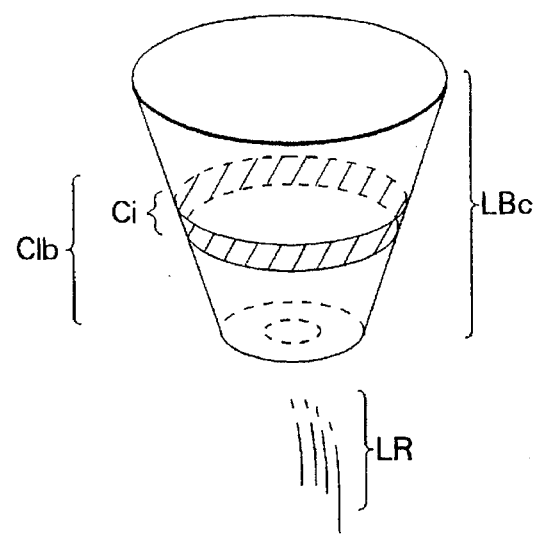
FIG. 10 illustrates the leaky-bucket model.
FIG. 11 illustrates the structure of the parameter memory in FIG. 7.

Referring to FIG. 10, the model is that of a leaky bucket with a certain capacity LBc, containing a certain amount Clb of fluid. Fluid leaks out through holes in the bottom of the bucket at a steady leak rate LR. Whenever a valid cell arrives, the amount of fluid in the bucket is incremented by an increment value Ci. The cell departure time Td is calculated as the time when the resulting amount of fluid (Clb+Ci) will have run out of the bucket.

One such leaky bucket is maintained for each connection. In the above context, a valid cell is a non-idle cell that arrives when a free element is available, so that it can be stored in the element memory 105, and is addressed to the connection of the particular bucket.

FIG. 11 shows one way of organizing the traffic parameter memory 104 when this leaky-bucket model is used. A separate area is allocated for each connection, the VPI/VCI values being used as the addresses of these areas. Each area has fields for storing information indicating a bucket capacity LBc, leak rate LR, cell increment value Ci, counter value Clb, and priority class (A or B). The leak rate LR and cell increment value Ci are set according to the bandwidth allocation of the connection. The counter value Clb is initially zero.

Cells arrive at the traffic shaper 100 at a constant rate. Each time a cell arrives, the counter value Clb of each bucket is decremented by the amount LR. If the cell is valid, then the counter value Clb of the relevant bucket (the counter value Clb at the VPI/VCI address of the cell) is also incremented by the amount Ci. The counter value Clb cannot be decremented below zero or incremented above the bucket capacity LBc, however, so if the above increment and decrement operations would carry the counter value outside these limits, the counter value is set to zero or LBc.

After the count values have been thus incremented and decremented, the cell departure time is calculated as follows. The new count value Clb of the bucket in which the cell was placed is divided by the leak rate LR of that bucket, and the result is converted to an integer (by rounding up, for example) to obtain the run-out time D of the bucket in its current state. D is then added to the current time Tc to obtain the cell departure time Td. If the result is greater than Tmax, then Td is set equal to Tc+D–Tmax–1, so that Td will be between zero and Tmax.

Using INT to indicate conversion to an integer, these operations can be written as follows.

$$D=INT(Clb/LR)$$

$$Td=Tc+D \text{ (if } Tc+D \leq Tmax)$$

$$Td=Tc+D-Tmax-1 \text{ (if } Tc+D > Tmax)$$

When there are many connections, decrementing a counter value Clb for each connection at every cell arrival is impractical, but the same result can be obtained by having the traffic parameter memory 104 also store, for each VPI/VCI address, the time of arrival Tr of the most recent cell with that address. Then when a new cell arrives with that address, the stored time Tr is subtracted from the current time Tc to obtain an elapsed time, this is multiplied by the leak rate LR, and the entire leakage over the elapsed time is subtracted in one step.

Referring again to FIG. 7, when the departure time calculation unit 103 has calculated the cell departure time Td, it reports this time Td via signal line 158 to the class A pointer memory controller 111 if the cell belongs to delay priority class A, or the class B pointer memory controller 113 if the cell belongs to delay priority class B. The priority class is indicated in the traffic parameter memory 104. Here it will be assumed that the priority class is A, and the operation of the class A pointer memory controller 111 will be described. The operation of the class B pointer memory controller 113 is similar.

The class A pointer memory controller 111 accesses the class A pointer memory 110 via signal line 159 at the address given by the cell departure time Td and reads the flag Fa and last-element pointer Pta of the assigned-element chain for this time Td. If the flag Fa indicates that the pointers Pfa and Pta are valid, the class A pointer memory controller 111 sends the last-element pointer Pta to the read/write controller 106 via signal line 160. If the flag Fa indicates that the pointers are not valid (indicating that no elements have yet been assigned to departure time Td), the class A pointer memory controller 111 notifies the read/write controller 106 of this via signal line 160.

If the read/write controller 106 receives the last-element pointer Pta, it updates the chain pointer field of the element indicated by that pointer Pta by writing the address of the element in which the input cell 120 is stored. This is the old Pff value that the read/write controller 106 obtained from the free-element pointer controller 107 and retained. The read/write controller 106 then sends the address of this element (the old Pff value) to the class A pointer memory controller 111 via signal line 160, and the class A pointer memory controller 111 updates the last-element pointer Pta of the assigned-element chain for time Td so that it indicates this new address. In this way the read/write controller 106 concatenates the element storing the new input cell 120 to the assigned-element chain of time Td in plane 921, as the new last element of that chain.

If, instead of receiving a last-element pointer Pta, the read/write controller 106 receives a notification of invalid pointers, it does not access the element memory 105, but simply sends the class A pointer memory controller 111 the address (the old Pff value) of the element storing the input cell 120. The class A pointer memory controller 111 writes this address into both the first-element pointer Pta and last-element pointer Pta for time Td, and updates the flag Fa to indicate that these pointers are now valid. This establishes a new assigned-element chain for time Td in plane 921 of the assigned-element pool 920, with the element storing the input cell 120 as the sole element in this chain.

This completes the description of cell input operations. Next the cell output operations, which are carried out concurrently with the cell input operations, will be described. The cell output operations consist of the following two operations, which are both performed each time the internal clock unit 108 alters the current time value To: transfer of assigned-element chains to the output queue; and output of a cell from the output queue. The transfer of assigned-element chains is carried our first.

When the current time is updated by the internal clock unit 108 to a new value Tc (between zero and Tmax), this new value is first reported via signal line 161 to the class A pointer memory controller 111, since class A has higher priority than class B. The class A pointer memory controller 111 accesses the class A pointer memory 110 at address Tc and fetches the first-element pointer Pfa, last-element pointer Pta, and flag Fa pertaining to the assigned-element chain having a cell departure time (Td) equal to Tc.

If the flag Fa indicates that pointers Pfa and Pta are invalid, meaning that no elements in class A have been assigned to depart at time Tc, the class A pointer memory controller 111 activates the class B pointer memory controller 113. If the flag Fa indicates that pointers Pfa and Pta are valid, the class A pointer memory controller 111 proceeds to concatenate the assigned-element chain for time Tc, defined by pointers Pfa and Pta, to the output queue as follows.

First, via signal line 162, the class A pointer memory controller 111 checks the output-queue flag Fw maintained in the output-queue pointer controller 109. If flag Fw is set to one, indicating that at least one element is currently queued for output, the class A pointer memory controller 111 next fetches the last-element pointer Ptw of the output queue from the output-queue pointer controller 109, again via signal line 162. The class A pointer memory controller 111 then passes pointers Pfa and Ptw to the read/write controller 106 via signal line 160, and instructs the read/write controller 106 to link the corresponding chains.

The read/write controller 106 does this by accessing the element memory 105 via signal line 154 and writing the value of pointer Pfa in the chain pointer field Pc of the element indicated by pointer Ptw (the last element in the output queue). This action links the assigned-element chain for time Tc to the output queue, thereby lengthening the output queue.

After instructing the read/write controller 106 to link the element chains, the class A pointer memory controller 111 passes the last-element pointer Pta of the assigned-element chain for time Tc to the output-queue pointer controller 109, via signal line 162. The output-queue pointer controller 109 writes the value of pointer Pta into the last-element pointer Ptw of the output queue, thereby updating pointer Ptw so that it indicates the last element of the lengthened output queue created by the read/write controller 106.

The class A pointer memory controller 111 also accesses the class A pointer memory 110 via signal line 159 and clears the flag Fa pertaining to the current time Tc to zero, to indicate that pointers Pfa and Pta are now invalid, because the elements in the assigned-element chain for the current time Tc have just been transferred into the output queue, so this assigned-element chain no longer exists.

If the output-queue flag Fw fetched by the class A pointer memory controller 111 from the output-queue pointer controller 109 is zero, indicating that there are currently no output-queued elements, the output-queue pointer controller 109 passes both of the pointers Pfa and Pta to the output-queue pointer controller 109. The output-queue pointer controller 109 updates the first-element pointer Pfw and last-element pointer Ptw of the output queue by writing the Pfa value into Pfw, and the Pta value into Ptw. This makes the assigned-element chain for time Tc into the output queue. The output-queue pointer controller 109 also sets the output-queue flag Fw to one, thus changing it to indicate that at least one output-queued element exists.

The class A pointer memory controller 111 also clears the flag Fa pertaining to the current time Tc in the class A pointer memory 110 to zero to indicate that pointers Pfa and Pta are now invalid. This completes the change of identity of the chain that was formerly the assigned-element chain for time Tc and is now the output queue.

After the class A pointer memory controller 111 has finished transferring the assigned-element chain of class A for the current time Tc from plane 921 in the assigned-element pool 920 to the output-element pool 930 as described above, it instructs the class B pointer memory controller 113 to transfer the assigned-element chain of class B for the current time Tc from plane 922 to the output queue. This operation is carried out in the same way, so a separate description will be omitted. Since the elements in the assigned-element chain of class A are linked to the output queue ahead of the elements in the assigned-element chain of class B, the output latency will be less for class A than for class B, thus giving the cells in class A the desired priority.

Next, the operation of cell output from the output queue will be described.

When the class B pointer memory controller 113 finishes its assigned-element transfer, it instructs the output-queue pointer controller 109 to begin cell output. The output-queue pointer controller 109 starts by checking the output-queue flag Fw. If Fw is zero, indicating that the output queue is empty, the output-queue pointer controller 109 takes no action, and no cell is output at the current time Tc.

If Fw is one, indicating that at least one output-queued element is present, the output-queue pointer controller 109 next compares the first-element and last-element pointers Pfw and Ptw of the output queue. If the two pointer values match, the output-queue pointer controller 109 clears the output-queue flag Fw to zero. If the two pointer values do not match, Fw is left set to one. The reason for clearing Fw to zero when Pfw and Ptw match is that this indicates that only one output-queued element is present, so after the cell in this element is output, there will be no output-queued elements.

While comparing pointers Pfw and Ptw, the output-queue pointer controller 109 also passes the first-element pointer Pfw to the read/write controller 106 via signal line 163. The read/write controller 106 accesses the element memory 105 at the address indicated by Pfw, reads the chain pointer field Pc at this address and temporarily stores the Pc value, and places the cell data in the cell information field at this address on signal line 151. In this way the traffic shaper 100 sends an output cell 121 on signal line 151.

The read/write controller 106 passes the Pc value back to the output-queue pointer controller 109 via signal line 163 in order to update the first-element pointer Pfw of the output queue. The output-queue pointer controller 109 writes the Pc value into this pointer Pfw, so the former second element in the output queue becomes the new first element.

The read/write controller 106 also passes the old Pfw value, indicating the element that stored the current output cell 121, to the free-element pointer controller 107 via signal line 153, with a request to update the last-element pointer Ptf of the free-element chain. The free-element pointer controller 107 responds by passing the current Ptf value to the read/write controller 106 via signal line 153. The read/write controller 106 accesses the last element on the free-element chain at the address indicated by this Ptf value, and writes the old Pfw value in the chain pointer field Pc of this element. In the meantime, after passing the Ptf value to the read/write controller 106, the free-element pointer controller 107 updates Ptf by writing the old Pfw value received from the read/write controller 106. If the free-element flag Ff is zero, the free-element pointer controller 107 also writes the old Pfw value in the first-element pointer Pff and sets the flag Ff to one to indicate that a free element is present. These operations concatenate the element that stored the output cell 121 to the free-element chain as the new last element of that chain.

This completes the cell output operations. If the output queue was not empty, the cell stored in the first element in the output queue has been output, and that element has been removed from the output queue and attached as the last element of the free-element chain.

One of the advantages of the first embodiment is that the traffic shaper 100 can handle a substantially unlimited number of connections, because the element memory 105 does not maintain a separate buffer for each connection. Instead, it maintains a separate buffer for each departure time from zero to Tmax. No matter how many connections there may be, Tmax can be set to permit the element memory 105 and pointer memories 110 and 112 to be of practical size.

Space in the element memory 105 is used efficiently because any element can store a cell for any connection. The total number of elements required accordingly depends on the total cell input and output rates, but not on the traffic rates of individual connections. When an input cell arrives, it is not necessary to have a free element for each connection, or connection category, to which the cell might belong. It is only necessary for there to be one free element somewhere in the element memory 105.

Nor is it necessary to make special allowances for very long assigned-element chains. To begin with, the assigned-element chains do not tend to become very long, because even if some connection produces a rapid burst of incoming cells, they will be assigned to different departure times, and the probability that a large number of cells from different connections will pile up on the same cell departure time is low. Furthermore, even if cells do pile up on the same departure time, this can be dealt with efficiently, because all available free elements can be marshaled to store the cells assigned to that departure time. The invented traffic shaper 100 does not waste space in the element memory 105. The invented traffic shaper accordingly requires less memory space for cell buffering than is required in conventional traffic-shaping schemes.

Although each element has a chain pointer field containing a next-element pointer, and further memory space is required for storing first-element and last-element pointers and flags, the amount of space taken up by these pointers and flags is insignificant in comparison with the cell size (fifty-three bytes for an ATM cell). Much more space is saved by allowing any element to store any cell, as described above, than is used up by these pointers and flags.

Another advantage is that when there are cells to be output, they are output regardless of the type of connection. Since the traffic shaper 100 does not check each connection at fixed cyclic intervals, it is not forced to output an idle cell if the connection currently being checked has no cell to output. What the traffic shaper 100 does check at fixed cyclic intervals are the assigned-element chains, but if it finds an empty chain it is again not forced to output an idle cell, because the output queue will usually contain other cells that can be output. Network and line resources are accordingly not wasted on the unnecessary transfer of idle cells. This advantage is moreover obtained regardless of the number of connections.

Yet another advantage of this embodiment is that it provides a simple and efficient means of granting delay priority. The priority scheme is not restricted in any way by the number of connections, because priority is applied within the assigned-element chains for each cell departure time, rather than on a connection-by-connection basis. Nor does the introduction of delay priority lead to waste of network resources when a high-priority connection has no cells to output, because both high-priority and low-priority cells are output from the same output queue.

A further advantage is that for any one connection, cells will automatically be output in their order of arrival. The same is true for cells assigned to any one cell departure time in any one priority class, because each chain of elements in the assigned-element pool 921 operates as a separate queue, in which cells are placed in their order of arrival. This serialization helps avoid unfair delays, and it is achieved without the use of separate memory areas or separate buffers, but simply through the use of pointers.

Second embodiment

Next a second novel traffic shaper will be described. This traffic shaper is suitable for shaping output traffic at an edge node of a communication network, where the traffic will be demultiplexed via separate lines to a plurality of receiving terminals. The description will assume that there are two such lines, designated as line A and line B. The description will focus on the differences between the traffic shapers in the first and second embodiments.

Figure 12:
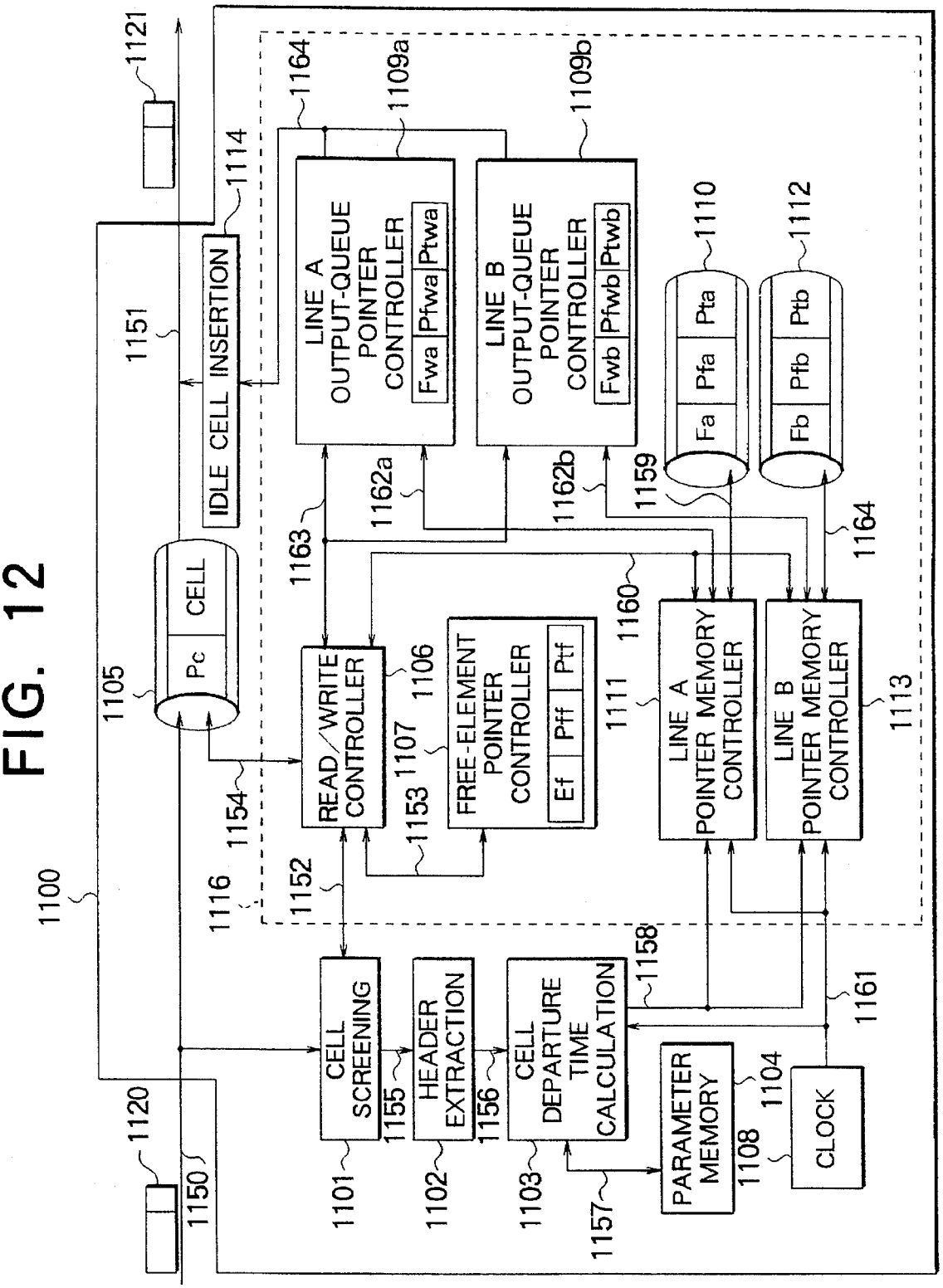
FIG. 12 is a block diagram of a second novel traffic shaper.

First, the structure of the second novel traffic shaper will be described with reference to FIG. 12. Corresponding parts in FIG. 12 and FIG. 7 are identified by corresponding reference numerals, using numerals in the thousands in FIG. 12. For example, reference numeral 1101 in FIG. 12 corresponds to reference numeral 101 in FIG. 7.

In the traffic shaper 1100 of the second embodiment, the element memory 1105 is logically organized into different planes for different lines, instead of different planes for different priority classes. Instead of the single output-queue pointer controller 109 of the first embodiment, the second embodiment has separate output-queue pointer controllers 1109a and 1109b for lines A and B. It also has a line A pointer memory 1110 and line B pointer memory 1112 in place of the class A pointer memory 110 and class B pointer memory 112 of the first embodiment, and a line A pointer memory controller 1111 and line B pointer memory controller 1113 in place of the class A pointer memory controller 111 and class B pointer memory controller 113. An additional idle cell inserter 1114 that was not present in the first embodiment is also provided. These are the major structural differences between the first and second embodiments.

The other parts of the traffic shaper 1100 are similar to the corresponding parts in the first embodiment, so descriptions will be omitted. The element memory control unit 1116 comprises the read/write controller 1106, free-element pointer controller 1107, output-queue pointer controllers 1109a and 1109b, pointer memories 1110 and 1112, and pointer memory controllers 1111 and 1113.

The element memory 1105 in the second embodiment has the same physical structure, shown in FIG. 8, as in the first embodiment, but has a different logical structure.

Figure 13:
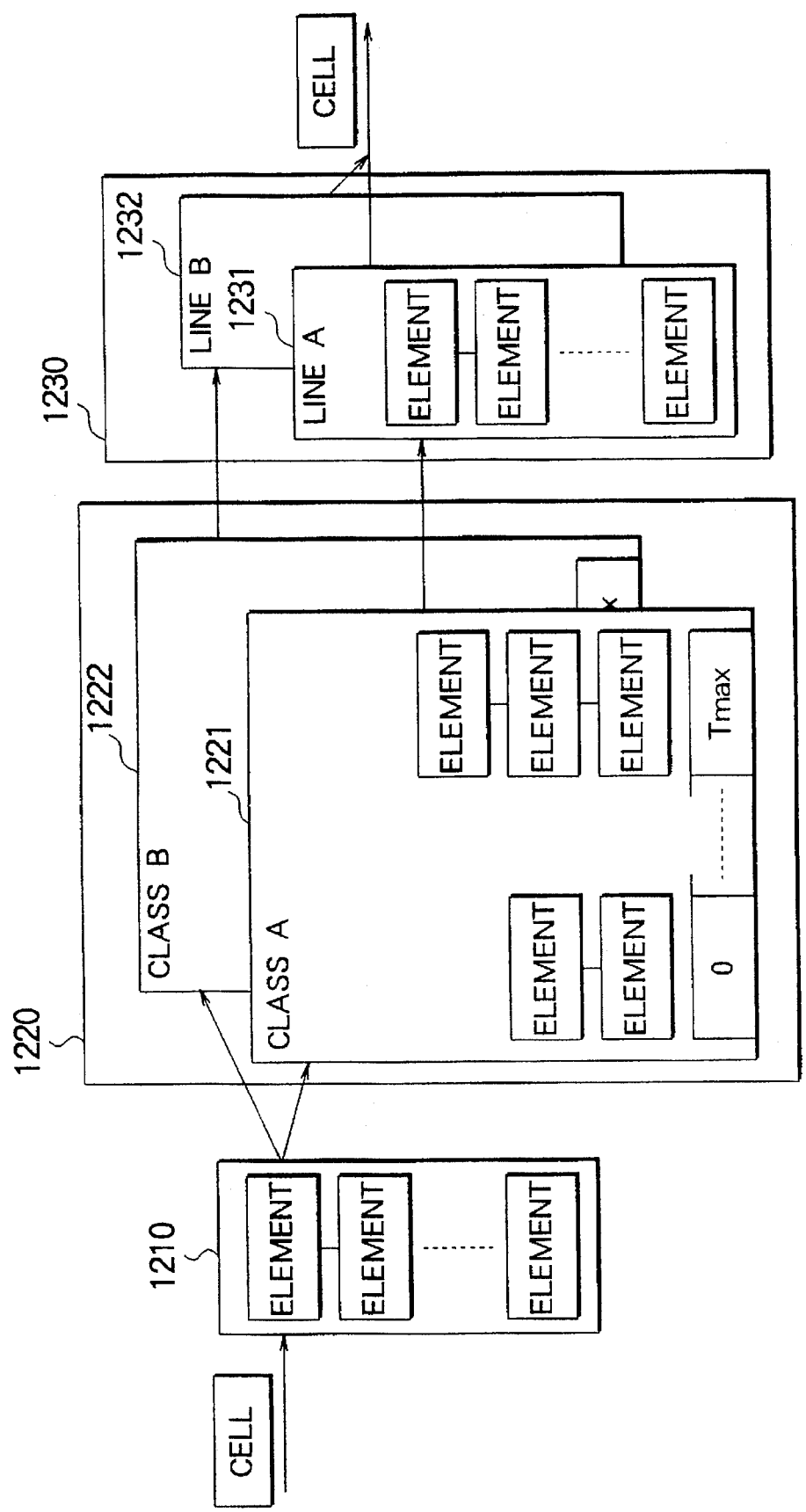
FIG. 13 illustrates the logical structure of the element memory in FIG. 12.

FIG. 13 shows the logical structure of the element memory 1105 in the second embodiment. As in the first embodiment, the elements are all linked into chains. The element memory 1105 is logically organized into a free element pool 1210, an assigned element pool 1220, and an output-element pool 1230.

The free element pool 1210 is similar to the free-element pool 910 in the first embodiment, so a description will be omitted. The output-element pool 1230 is divided into planes 1231 and 1232 for lines A and B. Although thus divided into line planes, the function of the output-element pool 1230 is the same as in the first embodiment: it holds elements queued for output. The assigned-element pool 1220 is likewise divided into planes 1221 and 1221 for lines A and B, each plane having an assigned-element chain for each cell departure time. Whereas the assigned-element pool 920 in the first embodiment was organized into delay priority planes, that is, the assigned-element pool 1220 in the second embodiment is organized into line planes.

The line A output-queue pointer controller 1109a maintains a first-element pointer Pfwa and last-element pointer Ptwa for the line A output queue (consisting of the elements in the output-element plane 1231 for line A), and a flag Fwa indicating whether or not there are any output-queued elements for line A.

Similarly, the line B output-queue pointer controller 1109b maintains a first-element pointer Pfwb and last-element pointer Ptwb for the line B output queue (consisting of the elements in the output-element plane 1231 for line B), and a flag Fwb indicating whether or not there are any output-queued elements for line B.

For each cell departure time, the line A pointer memory 1110 stores a first-element pointer Pfa and last-element pointer Pta for a corresponding assigned-element chain (in the assigned-element plane 1221 for line A), and a flag Fa indicating whether these pointers Pfa and Pta are valid or not. The line A pointer memory 1110 is accessed according to addresses corresponding to the cell departure times.

The line A pointer memory controller 1111 controls the reading and writing of the pointers Pfa and Pta and flags Fa in the line A pointer memory 1110.

Similarly, for each cell departure time, the line B pointer memory 1112 stores a first-element pointer Pfb and last-element pointer Ptb for a corresponding assigned-element chain (in the assigned-element plane 1221 for line B), and a flag Fb indicating whether these pointers Pfb and Ptb are valid or not. The line B pointer memory 1112 is also accessed according to addresses corresponding to the cell departure times.

The line B pointer memory controller 1113 controls the reading and writing of the pointers Pfb and Ptb and flags Fb in the line B pointer memory 1112.

The idle cell inserter 1114 inserts idle cells into output slots in response to idle cell insertion requests.

Next the operation of this traffic shaper 1100 will be described, starting with a description of cell input operations. These operations are quite similar to the cell input operations in the first embodiment, but it will be assumed that the headers of the input cells 1120 contain line identification information Nc identifying line A or B, in place of the virtual path and channel identifiers used in the first embodiment.

When there are no free elements, or when the input cell 1120 is an idle cell, the second embodiment operates exactly like the first embodiment, so descriptions of these cases will be omitted. When the input cell 1120 is not idle and a free element is available, the operations through the calculation of the cell departure time by the departure time calculation unit 1103, using the parameter table 1104, are essentially the same as in the first embodiment, so descriptions of these operations will also be omitted. These operations include the storing of the input cell 1120 in the free element indicated by the first-element pointer Pff of the free-element chain, the updating of this pointer Pff, and the retention of the old Pff value in the read/write controller 1106.

The parameter table 1104 in the second embodiment does not contain delay priority class information. The departure time calculation unit 1103 sends the calculated cell departure time Td to the line A pointer memory controller 1111 or the line B pointer memory controller 1113 via signal line 1158, according to the line identification information Nc in the header of the input cell 1120. The departure time Td is sent to the line A pointer memory controller 1111 if the line identification information Nc indicates line A, and to the line B pointer memory controller 1113 if the line identification information Nc indicates line B.

The operations performed by the line A pointer memory controller 1111 and line B pointer memory controller 1113 are similar, so only the operation of the line A pointer memory controller 1111 will be described below.

Upon receiving a cell departure time Td from the departure time calculation unit 1103, the line A pointer memory controller 1111 accesses the line A pointer memory 1110 via signal line 1159 and reads the flag Fa and last-element pointer Pta of the assigned-element chain for time Td. If the flag Fa is set to one (indicating that the pointers are valid), the class A pointer memory controller 111 sends the last-element pointer Pta to the read/write controller 1106 via signal line 1160. If the flag Fa is cleared to zero (pointers not valid, indicating that there are no assigned elements for time Td), the read/write controller 1106 is notified of this via signal line 1160.

If the read/write controller 1106 receives the last-element pointer Pta, it writes the address of the element in which the input cell 1120 is stored (the old Pff value) into the chain pointer field of the element indicated by that pointer Pta, thus adding the element storing the input cell 1120 to the end of the assigned-element chain of time Td in the assigned-element plane 1221 for line A. The read/write controller 1106 then sends the address of this element (the old Pff value) to the line A pointer memory controller 1111 via signal line 1160, and the line A pointer memory controller 1111 updates the last-element pointer Pta of the assigned-element chain for time Td in plane 1221 so that it indicates this new address.

If notified that the last-element pointer Pta is invalid, the read/write controller 1106 sends the line A pointer memory controller 1111 the address (the old Pff value) of the element storing the input cell 1120. The line A pointer memory controller 1111 writes this address into its first-element and last-element pointers Pfa and Pta for time Td, and alters the flag Fa to indicate that these pointers are now valid. This establishes a new assigned-element chain for time Td in the assigned-element plane 1221 for line A, the chain consisting of the element storing the input cell 1120.

The cell input operations described above are carried out independently of and concurrently with the cell output operations, which will be described next.

As in the first embodiment, the cell output operations consist of the transfer of assigned-element chains, followed by output of cells from the output queues. These output operations are carried out each time the internal clock unit 1108 generates a new current time Tc. The transfer of assigned-element chains will be described first.

In the first embodiment, in which the connections were assigned to delay priority classes, the higher-priority class A was processed before the lower-priority class B. In the second embodiment there are no delay priority classes, and no priority relationships between lines A and B, so if the read/write controller 1106 has the requisite capability, the transfers of assigned-element chains for lines A and B can be executed concurrently.

When a new current time value Tc (between zero and Tmax) is generated, this value is first reported via signal line 161 to the line A pointer memory controller 1111 and line B pointer memory controller 1113. The line A pointer memory controller 1111 accesses the line A pointer memory 1110 at address Tc and fetches the first-element pointer Pfa, last-element pointer Pta, and flag Fa pertaining to the assigned-element chain having a cell departure time (Td) equal to Tc.

If the flag Fa indicates that pointers Pfa and Pta are invalid, there are no assigned elements with cell departure time Tc for line A, so no assigned-element chain is transferred for line A. If the flag Fa indicates that pointers Pfa and Pta are valid, the line A pointer memory controller 1111 proceeds to concatenate the assigned-element chain for time Tc, defined by pointers Pfa and Pta, to the output queue for line A, by essentially the same procedure as in the first embodiment.

Specifically, the line A pointer memory controller 1111 checks the output-queue flag Fwa maintained in the line A output-queue pointer controller 1109a, via signal line 1162a. If flag Fwa is set to one, indicating that at least one element is queued for output to line A, the line A pointer memory controller 1111 next fetches the last-element pointer Ptwa of the output queue from the line A output-queue pointer controller 1109a via signal line 1162a, and passes pointers Pfa and Ptw to the read/write controller 1106 via signal line 1160, instructing the read/write controller 1106 to link the chains.

The read/write controller 1106 accesses the element memory 1105 via signal line 1154 and writes the value of pointer Pfa in the chain pointer field Pc of the element indicated by pointer Ptwa (the last element in the output queue for line A). This action links the assigned-element chain of line A for time Tc to the end of the output queue for line A, thereby lengthening this output queue.

After instructing the read/write controller 1106 to link these chains, the class A pointer memory controller 1111 passes the last-element pointer Pta of the assigned-element chain for time Tc to the line A output-queue pointer controller 1109a, via signal line 1162a. The line A output-queue pointer controller 1109a writes the value of pointer Pta into the last-element pointer Ptwa of the output queue for line A, thereby updating pointer Ptwa so that it indicates the last element of the lengthened output queue created by the read/write controller 1106.

The line A pointer memory controller 1111 also accesses the line A pointer memory 1110 via signal line 1159 and clears the flag Fa pertaining to the current time Tc to zero to indicate that pointers Pfa and Pta are now invalid, because the assigned-element chain for time Tc has just been transferred from plane 1221 in the assigned-element pool 1220 to plane 1231 in the output-element pool 1230.

If the output-queue flag Fwa fetched by the line A pointer memory controller 1111 from the line A output-queue pointer controller 1109a is zero, indicating that no elements are currently queued for output to line A, the line A output-queue pointer controller 1109a passes both pointers Pfa and Pta obtained from the line A pointer memory 1110 to the line A output-queue pointer controller 1109a, which proceeds to write the Pfa value into Pfwa, and the Pta value into Ptwa. The line A assigned-element chain for time Tc thus becomes the output queue for line A. The line A output-queue pointer controller 1109a also sets the output-queue flag Fwa to one, to indicate that at least one output-queued element exists. As before, the line A pointer memory controller 1111 clears the flag Fa pertaining to the current time Tc in the line A pointer memory 1110 to zero to indicate that pointers Pfa and Pta are now invalid, because the assigned-element chain for line A at time Tc no longer exists.

The operations of transferring assigned-element chains for line B from assigned-element plane 1221 to output-queued element plane 1231 are carried out similarly. A separate description will be omitted.

When the transfer of assigned-element chains from both assigned-element planes 1221 and 1222 to the line A and B output-element planes 1231 and 1232 has been completed by the procedure above, the operation of cell output from the output queues begins. This operation will be described next.

Cell output is performed according to pre-assigned output slots on signal line 1151. An output slot is a time slot of sufficient size for the output of one cell, including the cell header and the line identification information Nc of the cell.

Output slots are assigned to lines A and B in a fixed pattern, such as line A slots alternating with line B slots, or two line A slots followed by one line B slot. The contents of these slots will be distributed to lines A and B by a line distributor, not shown in the drawing. The slot pattern may also include output slots assigned to neither line A nor line B, but in the following description it will be assumed that there are no such unassigned output slots. The slot pattern is specified by information kept internally in the read/write controller 1106.

When the transfer of assigned elements for lines A and B ends, the read/write controller 1106 determines from its internal information whether the current output slot is assigned to line A or B, and notifies the corresponding output-queue pointer controller 1109a or 1109b. Here it will be assumed that the current output slot is assigned to line A, so the read/write controller 1106 notifies the line A output-queue pointer controller 1109a.

When notified by the read/write controller 1106, the line A output-queue pointer controller 1109a checks the output-queue flag Fwa. If Fwa is zero, indicating that the output queue for line A is empty, the line A output-queue pointer controller 1109a sends the idle cell inserter 1114 a request, via signal line 1164, to insert an idle cell. The idle cell inserter 1114 responds by placing an idle cell on the output signal line 1151 in the time slot assigned to line A.

If Fwa is one, indicating that there is at least one output-queued element for line A, the line A output-queue pointer controller 1109a next compares the first-element and last-element pointers Pfwa and Ptwa of the output queue for line A. If these two pointer values match, the line A output-queue pointer controller 1109a clears the output-queue flag Fwa to zero, because there is only one element in the chain. If the two pointer values do not match, Fwa is left set to one.

Besides comparing pointers Pfwa and Ptwa, the line A output-queue pointer controller 1109a passes the first-element pointer Pfwa to the read/write controller 1106 via signal line 1163. The read/write controller 1106 then accesses the element memory 1105 at the address indicated by Pfwa, reads the chain pointer field Pc at this address and temporarily stores the Pc value, and places the cell data in the cell information field at this address In the current output slot on signal line 1151, from which the cell 1121 will be distributed to line A.

The read/write controller 1106 passes the Pc value back to the line A output-queue pointer controller 1109a via signal line 1163 in order to update the first-element pointer Pfwa of the output queue for line A. The line A output-queue pointer controller 1109a writes the Pc value into this pointer Pfwa, making the former second element in the line A output queue into the new first element.

The element in which the output cell 1121 was stored is then returned to the free-element pool 1210 by the same procedure as in the first embodiment. If the free-element flag Ff is set to one, for example, the read/write controller 1106 passes the old Pfwa value received from the line A output-queue pointer controller 1109a to the free-element pointer controller 1107 via signal line 1153, and the free-element pointer controller 1107 passes back the current Ptf value. The read/write controller 1106 accesses the element memory 1105 at the address indicated by this Ptf value, and writes the old Pfwa value in the chain pointer field Pc at this address, while the free-element pointer controller 1107 updates the Ptf pointer by writing the old Pfwa value. The element in which the output cell 1121 was stored thus becomes the new last element of the free-element chain.

This completes output of one cell for line A, either a cell from the element memory 1105 or an idle cell inserted by the idle cell inserter 1114.

If the current output slot was assigned to line B instead of line A, the line B output-queue pointer controller 1109b initiates similar operations to output the cell stored in first element in the line B output queue, or an idle cell if this queue is empty. A separate description will be omitted.

The second embodiment provides most of the advantages of the first embodiment, including the capability to handle a large number of connections, the advantage of not wasting network resources regardless of the number of connections, a reduction in the amount of memory required for cell buffering, and the preservation of cell order when two cells are assigned to the same cell departure time.

A further advantage provided by the second embodiment is that in shaping the cell traffic for each line, automatically avoids bandwidth conflicts between the two lines. This is because cells that will be output on different lines are stored in different assigned element planes, are linked to different output queues, and are output in time slots assigned on a line-by-line basis.

Another advantage is that the second embodiment reduces the hardware requirements of the line distribution function at network edge notes. The line distributor can, for example, distribute cells to the correct lines by means of a selector that operates in synchronization with the flow of time slots on signal line 1151. The line distributor accordingly does not have to check the cell headers and does not require a cell buffer. The selector can also be built into the traffic shaper 1100, so that the traffic shaper 1100 performs most of the line distribution functions and the line distributor only needs to interface the separate cellstreams to the outgoing lines.

Current ATM communication networks must be interfaced to lines that operate with a data framing structure different from the ATM cell structure, so when a cellstream leaves the ATM network, it must be reformatted for transmission. For this reason, a line distributor is required at all exit points of the ATM network. By transferring most of the line distribution functions into the traffic shaper and thereby minimizing the line distributor hardware requirements, the second embodiment can significantly reduce the cost of ATM communication systems.

Third Embodiment

Next a third novel traffic shaper will be described. This traffic shaper, shown in FIG. 14, has a structure that exhibits the main idea of the invention in a particularly simple and direct way. This structure will be described through an explanation of the operation of the third embodiment.

Figure 14:
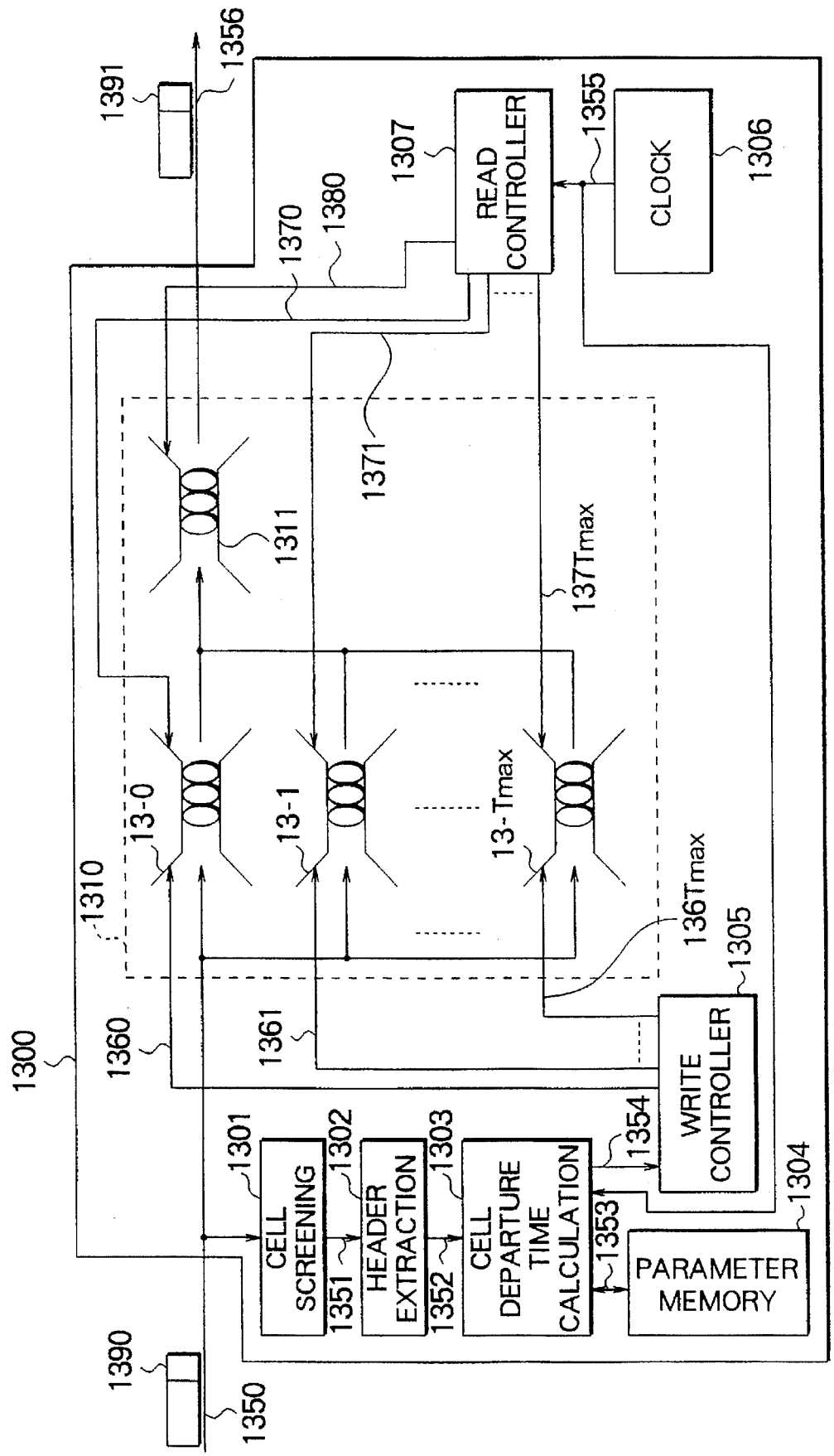
FIG. 14 is a block diagram of a third novel traffic shaper.

Referring to FIG. 14, the traffic shaper 1300 receives incoming cells 1390 on signal line 1350, stores them in a cell memory 1310 as described below, then outputs them as output cells 1391 from the cell memory 1310 on signal line 1356. The amount of time a cell spends in the cell memory 1310 is controlled according to parameters in a traffic parameter memory 1304, so as to satisfy bandwidth allocation conditions.

The cell memory 1310 comprises a plurality of FIFO memories 13-0 to 13-Tmax, corresponding to cell departure times from zero to Tmax, and an output FIFO memory 1311.

First, the operation of storing an input cell 1390 in the cell memory 1310 will be described.

As a first step, the cell 1390 is received by the cell screening unit 1301, which determines from the cell header whether the cell is idle or not. If the cell 1390 is not idle, it is passed via signal line 1351 to the header extraction unit 1302, which extracts the cell header, reads the virtual path and channel identifiers (VPI/VCI), and sends the VPI/VCI information via signal line 1352 to the departure time calculation unit 1303.

The departure time calculation unit 1303 refers (via signal line 1353) to the traffic parameter memory 1304, which contains bandwidth allocation parameters for each connection, accesses the parameters corresponding to the VPI/VCI address, and uses these parameters to calculate a cell departure time Td for the cell 1390. In this calculation, if necessary, the departure time calculation unit 1303 also refers to the current time Tc, which is furnished by the internal clock unit 1306. The cell departure time can be calculated by the leaky-bucket method described above, or another appropriate method.

Having calculated the cell departure time Td, the departure time calculation unit 1303 notifies the write controller 1305, which sends a command to the FIFO memory 13-Td in the cell memory 1310 (Td is an integer from zero to Tmax) via signal line 136Td, causing FIFO memory 13-Td to store the input cell 1390.

Next the cell output operations will be described.

The internal clock unit 1306 updates the current time Tc at the cell output rate, reporting each new time value to the read controller 1307 via signal line 1355.

When furnished with a new current time Tc, the read controller 1307 sends a read command to the corresponding FIFO memory 18-Tc via signal line 137Tc (Tc is an integer from zero to Tmax). This command causes all cells currently stored in FIFO memory 13-Tc to be transferred into the output FIFO memory 1311.

The read controller 1307 then sends a read command to the output FIFO memory 1311 via signal line 1380, causing one cell 1391 (the oldest cell currently stored in FIFO memory 1311) to be output on signal line 1356.

Though not as effective as the first two embodiments, the traffic shaper 1800 of the third embodiment still retains the following advantages: (i) it permits a very large number of connections to be handled concurrently; (ii) it uses network and line resources effectively, regardless of the number of connections; (iii) it reduces the amount of memory required for cell buffering to satisfy bandwidth allocation conditions; and (iv) it assures that, if two or more cells have the same cell departure time, they will be output in their order of arrival.

Fourth embodiment

Referring again to FIG. 2, the invention can also be embodied as the ATM communication apparatus 32 or 34 in the network 25, employing the traffic shaper 100 in FIG. 7 as its traffic shaper S. More specifically, the embodiment can be an ATM switch or ATM cross-connect apparatus employing this traffic shaper 100. Alternatively, the traffic shaper 1300 in FIG. 14 may be employed as the traffic shaper S. The result in either case is an ATM communication apparatus with the advantages described above.

Fifth embodiment

Figure 1:
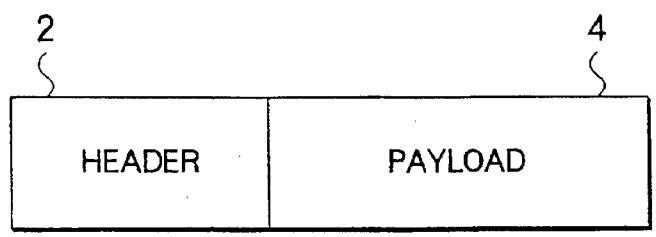
FIG. 1 illustrates the structure of an ATM cell.
Figure 2:
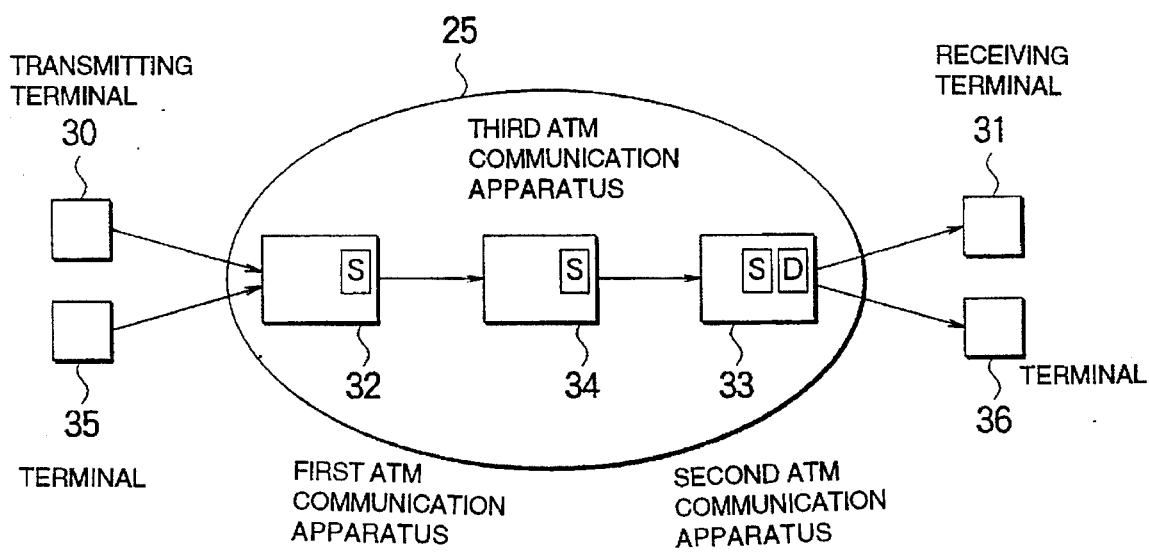
FIG. 2 illustrates data transport through a network.
Figure 3:
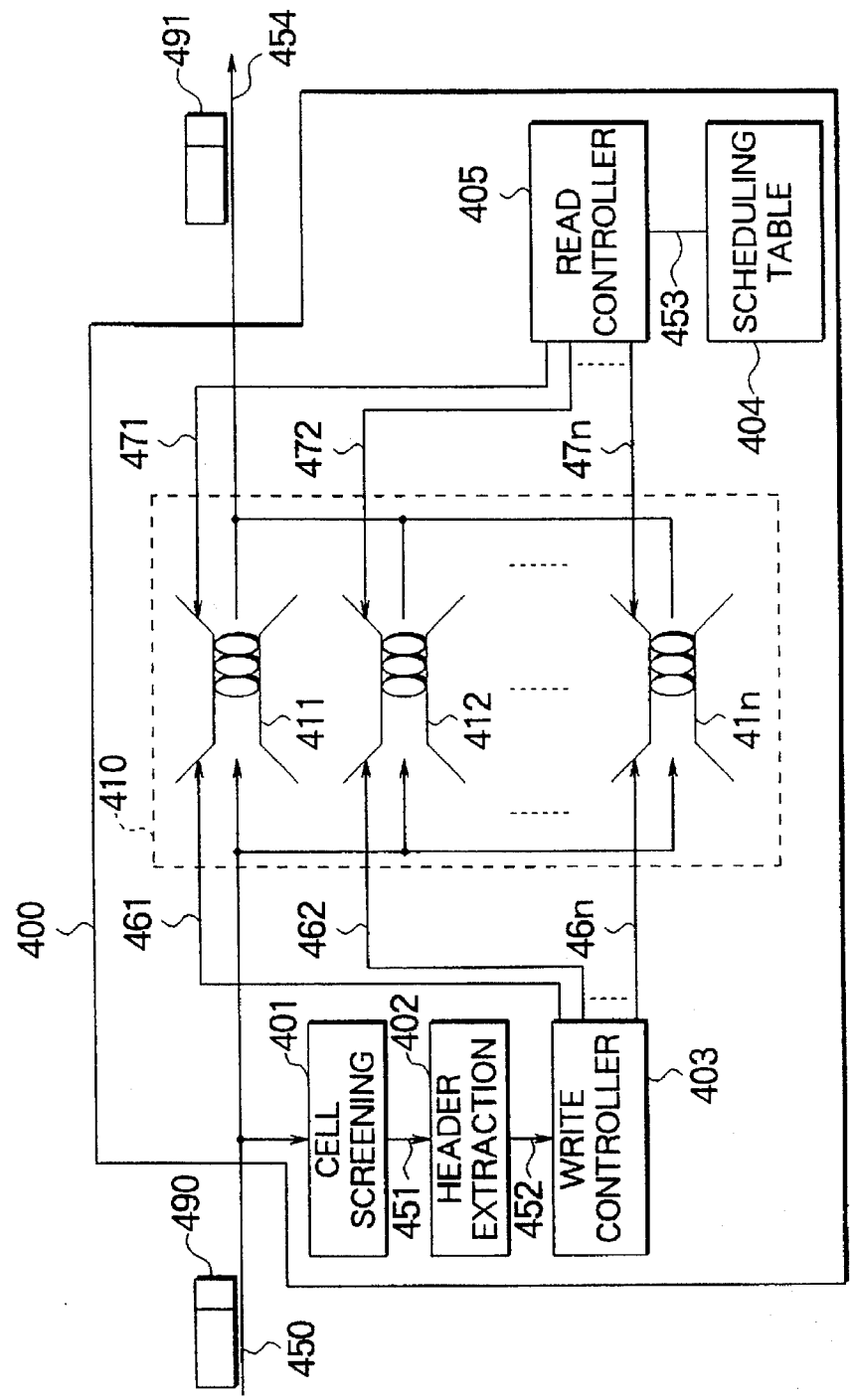
FIG. 3 is a block diagram of a conventional traffic shaper.

Still referring to FIG. 2, the fifth embodiment of the invention is the ATM communication apparatus 33, employing the traffic shaper 1100 of FIG. 12 as its traffic shaper S, and a line distributor of the simple type described in connection with FIG. 12 as its line distributor D.

Figure 15:
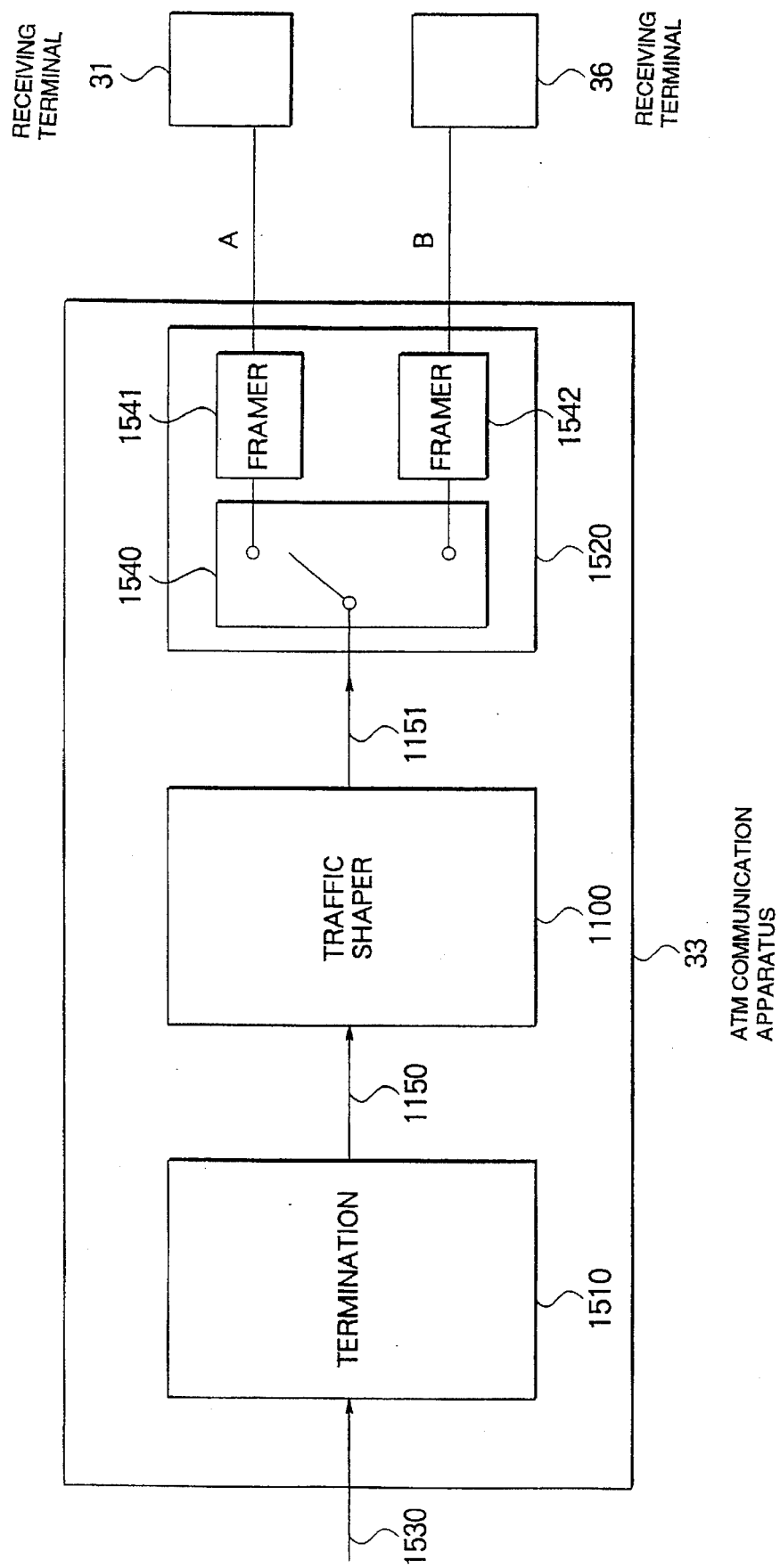
FIG. 15 is a block diagram of a novel packet communication apparatus.

FIG. 15 shows this ATM communication apparatus 33 in somewhat more detail. In addition to the traffic shaper 1100, the apparatus comprises a termination unit 1510 and line distributor 1520. The termination unit 1510 performs functions such as deframing, i.e. the removal of framing pattern bits from the data stream on the input network line 1530, so that a standard ATM cellstream can be supplied to the traffic shaper 1100 on its input signal line 1150.

The line distributor 1520 comprises a selector 1540 as described earlier, which selects output lines A and B in turn, following the same pattern as the pattern of output slot assignments on signal line 1151. This selector 1540 outputs cells to framers 1541 and 1542, which frame the cell information for transmission on lines A and B, respectively. Line A is connected to receiving terminal 31, and line B to receiving terminal 36.

The line distributor 1520 has a simple structure and requires only a small amount of buffer memory in the framers 1541 and 1542. The total amount of memory required in the traffic shaper 1100 and line distributor 1520 is greatly reduced as compared with the prior art.

The invented ATM communication apparatus may of course comprise facilities in addition to those shown in FIG. 15, such as a switching fabric and facilities for operations, administration, and maintenance.

Variations

Several variations of the preceding embodiments have been mentioned in the course of the descriptions above. Several more will be pointed out below.

Although the first embodiment had just two delay priority classes, the number of classes can be three or more. It suffices to provide additional priority planes in the assigned-element pool 920 in FIG. 9. The priorities can be set so as to give highest priority to connections in which cells containing network control information are inserted, since it is the delay of these cells that has the greatest adverse impact on network performance.

The second embodiment served only two output lines A and B, but it can be adapted to serve more lines by adding more planes to the assigned-element and output-element pools 1220 and 1230. The invented traffic shaper can readily handle traffic for any number of output lines, by taking cells from the corresponding output queues in the designated pattern of output slots.

The second and third embodiments made no provision for assigning connections to different delay priority classes, but this could be done in the same way as in the first embodiment. In the second embodiment, for example, it suffices to provide a separate plane in the assigned-element pool 1220 for each combination of an output line and a priority class. The output-element pool 1230 still needs only one plane per output line. In the third embodiment, a separate plane of FIFO memories can be provided for each priority class in the cell memory 1310.

The third embodiment can also be adapted to facilitate line distribution. For example, the cell memory 1310 can be divided into different planes for different lines, as were the assigned-element pool 1220 and output-element pool 1230 in the second embodiment.

In the first and second embodiments it would be possible to provide an independent element memory for each priority class, or each output line, instead of dividing a single element memory into different planes.

The method of receiving input cells in the first and second embodiments was first to store the cell in the cell information field of a free element, then, if the cell was not idle, to update pointers so as to attach the element to an assigned-element chain. As an alternative method, it is possible to place each input cell temporarily in a small, separate input buffer, then, if the cell is not idle, to write the cell data into the cell information field of a free element and update the chain pointer field Pc of that element at the same time.

The invention is not restricted to the memory configurations and memory management methods of the first three embodiments. The element memory in the first embodiment was managed by means of a separate pointer memory and pointer memory controller for each delay priority class, the element memory in the second embodiment was managed by means of a separate pointer memory and pointer memory controller for each output line, and the cell memory in the third embodiment had a separate FIFO memory for each cell departure time, in addition to an output FIFO memory, but the invention can be practiced with any memory configuration and method of storing input cells that permits identification of cell departure times, and of cells having the same cell departure time. As one possibility, the cells themselves can be stored in one memory, while another memory stores the addresses of all cells assigned to each cell departure time.

Traffic shaping was carried out in the preceding embodiments in terms of connections corresponding to individual VPI/VCI addresses, but this is not a restriction either. The invention can be practiced using other logical units of traffic control. A single bandwidth allocation could be established for each virtual path (VPI), for example.

Nor is the invention restricted to use in ATM communication systems. It can be applied in any type of packet communication apparatus that faces similar problems of bandwidth management.

None of the above modifications alter the basic advantages of the invention. Since it stores input cells according to their calculated cell departure times instead of according to their destinations, the invented traffic shaper can support a very large number of connections. By avoiding unnecessary output of idle cells, the invented traffic shaper also makes effective use of network bandwidth resources, regardless of the number of connections. Furthermore, by storing input cells in an efficient manner, the invention can reduce the required amount of cell buffer memory.

Those skilled in the art will recognize that many other modifications can be made within the scope of the invention as claimed below.

What is claimed is:

1. A method of controlling packet output from a node in a packet communication network to conform to designated bandwidth allocations, comprising the steps of:

receiving packets at said node;

calculating a departure time for each packet thus received, according to said bandwidth allocations;

storing the packets thus received in a packet memory, each packet being stored according to the departure time calculated for said packet;

transferring the packets stored in said packet memory to an output queue in a said packet memory at said departure times, each packet being transferred at the departure time calculated for said packet; and outputting said packets that do not have identical departure times in sequence from said output queue;

wherein said packets have priorities, and packets having identical departure times are transferred to said output queue in order of said priorities.

2. The method of claim 1 wherein, in said packet memory, said packets are stored in separate queues for separate departure times.

3. The method of claim 1, wherein said packets are stored in separate queues in said packet memory, each queue among said separate queues corresponding to one departure time and one priority among said priorities.

4. The method of claim 1, wherein:

said packets are designated for output from said node on at least two different lines;

said packet memory has a separate output queue for each of said lines; and in said step of transferring, said packets are transferred to output queues corresponding to their designated lines.

5. The method of claim 4, wherein said packets are stored in separate queues in said packet memory, each queue among said separate queues corresponding to one departure time and one line among said lines.

6. The method of claim 1, wherein said packets are asynchronous-transfer-mode cells.

7. The method of claim 1, wherein said departure times are calculated by a leaky-bucket algorithm.

8. A method of controlling packet output from a node in a packet communication network to conform to designated bandwidth allocations, comprising the steps of:

receiving packets at said node;

calculating a departure time for each packet thus received, according to said bandwidth allocations;

storing the packets thus received in a packet memory, each packet being stored according to the departure time calculated for said packet;

transferring the packets stored in said packet memory to an output queue in a said packet memory at said departure times, each packet being transferred at the departure time calculated for said packet, and packets having identical departure times being transferred simultaneously; and outputting said packets in sequence from said output queue;

wherein, in said packet memory, said packets are stored in separate queues for separate departure times;

wherein said packet memory is organized into elements, each element storing one packet, and said elements also store respective pointers used to define said output queue and said separate queues.

9. The method of claim 8, wherein said step of transferring is carried out by modifying said pointers.

10. The method of claim 9, wherein said packet memory also comprises a free-element pool, from which elements are supplied to said separate queues for storing said packets in said separate queues, and to which free-elements are returned from said output queue after output of said packets.

11. The method of claim 10, wherein said step of storing comprises:

storing a packet in an element in said free-element pool; and modifying at least one of said pointers so as to transfer said element from said free-element pool to one of said separate queues.

12. The method of claim 8, wherein said packets are asynchronous-transfer-mode cells.

13. The method of claim 8, wherein said departure times are calculated by a leaky-bucket algorithm.

14. A traffic shaper for receiving packets on a first signal line and outputting said packets on a second signal line in accordance with designated bandwidth allocations, comprising:

an internal clock unit for counting departure times in a repeating cycle;

a parameter memory for storing information related to said bandwidth allocations;

a departure time calculation unit coupled to said parameter memory, for assigning the packets received on said first signal line to departure times in said repeating cycle, these departure times being calculated according to the information stored in said parameter memory;

a packet memory for storing the packets received on said first signal line pending output of said packets on said second signal line; and a packet memory control unit coupled to said internal clock unit, said departure time calculation unit, and said packet memory, for causing said packet memory to store said packets according to the departure times to which said packets are assigned, and to output said packets to said second signal line according to the departure times to which said packets are assigned;

wherein said packets have priorities, and said packet memory control unit also causes said packets to be output from said packet memory according to said priorities.

15. The traffic shaper of claim 14, wherein said packets have communication-line assignments, and said packet memory control unit also causes said packets to be output from said packet memory according to said communication-line assignments.

16. The traffic shaper of claim 14, wherein said packets are asynchronous-transfer-mode cells.

17. A traffic shaper for receiving packets on a first signal line and outputting said packets on a second signal line in accordance with designated bandwidth allocations, comprising:

an internal clock unit for counting departure times in a repeating cycle;

a parameter memory for storing information related to said bandwidth allocations;

a departure time calculation unit coupled to said parameter memory, for assigning the packets received on said first signal line to departure times in said repeating cycle, these departure times being calculated according to the information stored in said parameter memory;

a packet memory for storing the packets received on said first signal line pending output of said packets on said second signal line; and a packet memory control unit coupled to said internal clock unit, said departure time calculation unit, and said packet memory, for causing said packet memory to store said packets according to the departure times to which said packets are assigned, and to output said packets to said second signal line according to the departure times to which said packets are assigned;

wherein said packet memory comprises elements having respective pointers for organizing said elements into chains, each of said elements also having space for storing one of said packets.

18. The traffic shaper of claim 17, wherein the elements in said packet memory are organized into:

a free-element chain in said packet memory, comprising elements in which packets are not stored;

a plurality of assigned-element chains in said packet memory, said assigned-element chains being assigned to respective departure times and comprising elements storing packets assigned matching departure times; and an output-element chain in said packet memory, to which elements are transferred from said assigned-element chains at the departure times to which said assigned-element chains are assigned, and from which packets are output to said second signal line.

19. The traffic shaper of claim 18, wherein:

packets are output on said second signal line in time slots assigned to a plurality of communication lines, for demultiplexing to said communication lines;

each packet received by said traffic shaper is assigned to one of said communication lines; and each assigned-element chain in said plurality of assigned-element chains is assigned to one departure time among said departure times and one communication line among said plurality of communication lines, and comprises elements storing packets assigned to said one departure time and said one communication line.

20. The traffic shaper of claim 18, wherein said packet memory control unit has pointer memories for storing pointers identifying said free-element chain, said assigned-element chains, and said output-element chain.

21. The traffic shaper of claim 18, wherein:

said packets have priorities; and each assigned-element chain in said plurality of assigned-element chains is assigned to one departure time among said departure times and one priority among said priorities, and comprises elements storing packets assigned to said one departure time and having said one priority.

22. The traffic shaper of claim 21, wherein said packet memory control unit transfers elements from assigned-element chains assigned to identical departure times to said output-element chain in order of the priorities of said elements.

23. The traffic shaper of claim 17, wherein said packet memory comprises:

a plurality of first-in-first-out memories, each one of said plurality of first-in-first-out memories storing packets assigned to a corresponding one departure time; and an output first-in-first-out memory for receiving, from each first-in-first-out memory in said plurality of first-in-first-out memories, all packets stored in said first-in-first-out memory, at the one departure time to which said first-in-first-out memory corresponds.

24. The traffic shaper of claim 17, wherein said packets are asynchronous-transfer-mode cells.

25. A packet communication apparatus for sending and receiving packets at a node in a packet communication network, having a traffic shaper for controlling output of said packets from said node in accordance with designated bandwidth allocations, wherein said traffic shaper comprises:

an internal clock unit for counting time cyclically;

a parameter memory for storing information related to said bandwidth allocations;

a departure time calculation unit coupled to said parameter memory, for calculating departure times of the packets received at said node according to the information stored in said parameter memory;

a packet memory for storing said packets pending output of said packets from said node; and a packet memory control unit coupled to said internal clock unit, said departure time calculation unit, and said packet memory, for controlling the storing of said packets in said packet memory according to said departure times, and controlling output of said packets from said packet memory according to said departure times;

wherein said packets have priorities, and said packet memory control unit also controls the output of said packets according to said priorities.

26. The traffic shaper of claim 25, wherein:

said node is connected to different output lines; and said packet memory control unit causes said packets to be output from said packet memory on an internal signal line in output time slots assigned to respective output lines.

27. The traffic shaper of claim 26, also comprising a line distributor for distributing the packets output from said packet memory in said traffic shaper to respective output lines.

* * * * *